United States Patent

(12) United States Patent
Temple

(10) Patent No.: US 12,482,246 B2
(45) Date of Patent: Nov. 25, 2025

(54) OBJECT DETECTION SYSTEM AND METHOD FOR UPDATING CARTESIAN REPRESENTATION OF REGION OF INTEREST

(71) Applicant: CRON AI LTD., London (GB)

(72) Inventor: Robert De Temple, Essen (DE)

(73) Assignee: CRON AI LTD., London (GB)

( * ) Notice: Subject to any disclaimer, the term of this patent is extended or adjusted under 35 U.S.C. 154(b) by 605 days.

(21) Appl. No.: 17/931,751

(22) Filed: Sep. 13, 2022

(65) Prior Publication Data
US 2024/0087302 A1  Mar. 14, 2024

(51) Int. Cl.
G06V 10/80 (2022.01)
G06V 10/25 (2022.01)
G06V 10/82 (2022.01)

(52) U.S. Cl.
CPC ............ G06V 10/803 (2022.01); G06V 10/25 (2022.01); G06V 10/82 (2022.01); G06V 2201/07 (2022.01)

(58) Field of Classification Search
None
See application file for complete search history.

(56) References Cited

U.S. PATENT DOCUMENTS

| | | | |
|---|---|---|---|
| 11,048,948 B2 | 6/2021 | Chan et al. | |
| 11,062,454 B1 | 7/2021 | Cohen et al. | |
| 11,157,014 B2 | 10/2021 | Andola et al. | |
| 2017/0076195 A1 | 3/2017 | Yang et al. | |
| 2018/0173971 A1 | 6/2018 | Jia et al. | |
| 2020/0025931 A1 | 1/2020 | Liang et al. | |
| 2020/0082207 A1 | 3/2020 | Xie et al. | |
| 2020/0160559 A1 | 5/2020 | Urtasun et al. | |
| 2020/0210813 A1 | 7/2020 | Peters et al. | |

(Continued)

FOREIGN PATENT DOCUMENTS

| | | |
|---|---|---|
| CN | 112434682 | 4/2021 |
| DE | 102020202305 | 8/2021 |

(Continued)

OTHER PUBLICATIONS

Zhang et al., "PolarNet: An Improved Grid Representation for Online LiDAR Point Clouds Semantic Segmentation," arXiv: 2003.14032v2 [cs.CV] Apr. 26, 2020 (Year: 2020).*

(Continued)

Primary Examiner — Soo Shin
(74) Attorney, Agent, or Firm — Colson Law Group, PLLC

(57) ABSTRACT

A method for updating a cartesian representation includes receiving a sensor POV data based on a sensor data generated by at least one sensor for a plurality of view cones and generating a polar feature vector based on the sensor POV data. The polar feature vector includes a plurality of cone vectors corresponding to the plurality of view cones. The method further includes mapping at least one cell from a plurality of cells of the cartesian representation with at least one cone vector from the plurality of cone vectors, receiving at least one offset vector corresponding to the at least one cell, concatenating at least the at least one cone vector and the at least one offset vector to generate at least one transformed tensor for the at least one cell, and generating at least one learned output based on the at least one transformed tensor.

19 Claims, 10 Drawing Sheets

(56) References Cited

U.S. PATENT DOCUMENTS

| | | | |
|---|---|---|---|
| 2020/0280429 A1 | 9/2020 | Su et al. | |
| 2021/0342605 A1 | 11/2021 | Walessa et al. | |
| 2021/0342609 A1 | 11/2021 | Smolyanskiy et al. | |
| 2021/0365697 A1 | 11/2021 | Vaquero Gomez et al. | |
| 2022/0066456 A1* | 3/2022 | Ebrahimi Afrouzi | ........................ G06F 3/04883 |

FOREIGN PATENT DOCUMENTS

| | | | |
|---|---|---|---|
| EP | 3525131 | 8/2019 | |
| EP | 3624077 | 3/2020 | |
| WO | 2021058300 | 4/2021 | |
| WO | 2021167189 | 8/2021 | |
| WO | 2021175434 | 9/2021 | |
| WO | 2021183256 | 9/2021 | |
| WO | WO-2021175434 A1 * | 9/2021 | ....... G06F 18/24137 |

OTHER PUBLICATIONS

Minle Li, One-Stage Multi-Sensor Data Fusion Convolutional Neural Network for 3D Object Detection, MDPI Journal, Sensors, vol. 19, Issue 6, 10.3390/s19061434.

Yu Huang, A data quality-aware unified 3D Object Detection Method with LiDAR and Camera Sensors, Medium Article.

Darshan Ramesh Bhanushali, Multi-Sensor Fusion for 3D Object Detection, Theses, RIT Scholar Works.

Oier Mees, Choosing smartly: Adaptive multimodal fusion for object detection in changing environments, ACM Digital Library, 2016 IEEE/RSJ International Conference on Intelligent Robots and Systems (IROS).

* cited by examiner

OBJECT DETECTION SYSTEM AND METHOD FOR UPDATING CARTESIAN REPRESENTATION OF REGION OF INTEREST

TECHNICAL FIELD

The present disclosure relates to an object detection system for updating a cartesian representation of a region of interest and a method thereof.

BACKGROUND

Nowadays, object detection units use data from multiple sensors located in a region of interest (ROI) to obtain information about objects in the ROI. Such data from the multiple sensors may require to be fused and represented in one common, coherent frame of reference to accurately obtain information about the objects in the ROI.

In some cases, raw data from the multiple sensors may be fused and then processed by the object detection units to obtain the information about the objects in the ROI. However, in some cases, there may be no obvious coherent way to fuse the raw data in one frame of reference, especially if the multiple sensors are of mixed modality. Further, the multiple sensors may not be synchronized perfectly or may not provide direct measurements. In addition, the raw data may have a very high data volume. Therefore, processing the raw data may require high computational, memory, and/or power resources.

In some other cases, the object detection units may fully process data from each of the multiple sensors at an individual object creation stage to generate a data indicative of a detected object and may then fuse such data from each of the multiple sensors to obtain the information about the objects in the ROI. However, in such cases, much of the information about the objects may be lost at the individual object creation stage, thereby making it difficult to recover the objects that are hard to detect by the multiple sensors individually.

SUMMARY

In a first aspect, the present disclosure provides a method for updating a cartesian representation of a region of interest (ROI). The method includes receiving, by at least one sensor encoding neural network, a sensor point of view (POV) data. The sensor POV data is based on a sensor data generated by at least one sensor for a plurality of view cones. The method further includes generating, via the at least one sensor encoding neural network, a polar feature vector based on the sensor POV data. The polar feature vector includes a plurality of cone vectors corresponding to the plurality of view cones. The method further includes mapping, by a projection module, at least one cell from the plurality of cells of the cartesian representation with at least one cone vector from the plurality of cone vectors. The at least one cone vector corresponds to at least one view cone from the plurality of view cones. The method further includes receiving, by the projection module, at least one offset vector corresponding to the at least one cell. The at least one offset vector is based on a position of the at least one sensor relative to the at least one cell of the cartesian representation. The method further includes concatenating, via the projection module, at least the at least one cone vector and the at least one offset vector to generate at least one transformed tensor corresponding to the at least one cell. The method further includes generating, via a convolutional neural network, at least one learned output based on the at least one transformed tensor. The method further includes generating, via an object detection network, an updated cartesian representation based on the at least one learned output.

In a second aspect, the present disclosure provides an object detection system for updating a cartesian representation of a region of interest (ROI). The object detection system includes at least one sensor covering at least a portion of the ROI. The at least one sensor is configured to generate a sensor data for a plurality of view cones. The object detection system further includes at least one sensor encoding neural network configured to receive a sensor POV data. The sensor POV data is based on the sensor data. The at least one sensor encoding neural network is further configured to generate a polar feature vector based on the sensor POV data. The polar feature vector includes a plurality of cone vectors corresponding to the plurality of view cones. The object detection system further includes a projection module communicably coupled to the at least one sensor encoding neural network. The projection module is configured to map at least one cell from the plurality of cells of the cartesian representation with at least one cone vector from the plurality of cone vectors. The at least one cone vector corresponds to at least one view cone from the plurality of view cones. The projection module is further configured to receive at least one offset vector corresponding to the at least one cell. The at least one offset vector is based on a position of the at least one sensor relative to the at least one cell of the cartesian representation. The projection module is further configured to concatenate at least the at least one cone vector and the at least one offset vector to generate at least one transformed tensor corresponding to the at least one cell. The object detection system further includes a convolutional neural network communicably coupled to the projection module. The convolutional neural network is configured to generate at least one learned output based on the at least one transformed tensor. The object detection system further includes an object detection network communicably coupled to the convolutional neural network. The object detection network is configured to generate an updated cartesian representation based on the at least one learned output.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

Exemplary embodiments disclosed herein is more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labelled with the same number.

DETAILED DESCRIPTION

Figure 1:
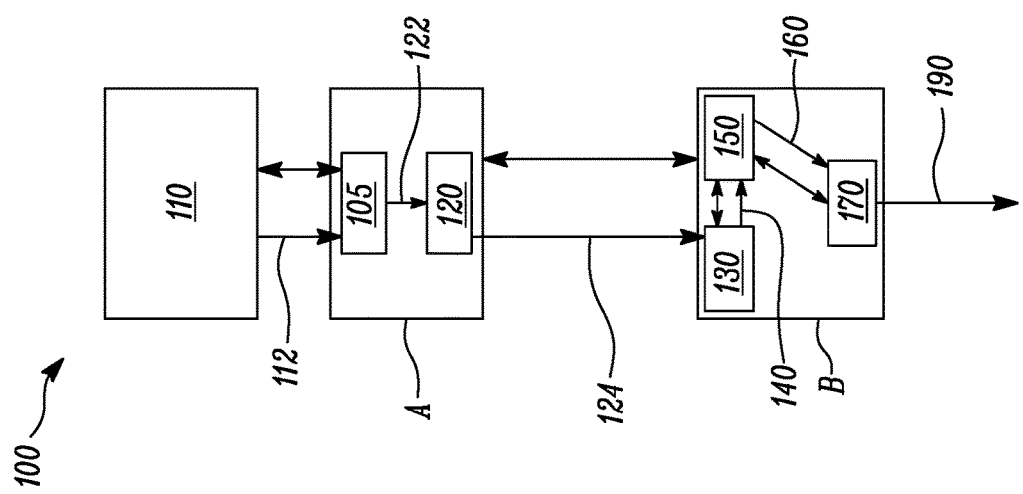
FIG. 1 illustrates a schematic block diagram of an object detection system, according to an embodiment of the present disclosure.

In the following description, reference is made to the accompanying figures that form a part thereof and in which various embodiments are shown by way of illustration. It is to be understood that other embodiments are contemplated and is made without departing from the scope or spirit of the present disclosure. The following detailed description, therefore, is not to be taken in a limiting sense.

In the following disclosure, the following definitions are adopted.

As used herein, all numbers should be considered modified by the term "about". As used herein, "a," "an," "the," "at least one," and "one or more" are used interchangeably.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties).

As used herein, the terms "first" and "second" are used as identifiers. Therefore, such terms should not be construed as limiting of this disclosure. The terms "first" and "second" when used in conjunction with a feature or an element can be interchanged throughout the embodiments of this disclosure.

As used herein, "at least one of A and B" should be understood to mean "only A, only B, or both A and B".

As used herein, the terms "communicably coupled to" and "communicably connected to" refers to direct coupling between components and/or indirect coupling between components via one or more intervening components. Such components and intervening components may comprise, but are not limited to, junctions, communication paths, components, circuit elements, circuits, functional blocks, and/or devices. As an example of indirect coupling, a signal conveyed from a first component to a second component may be modified by one or more intervening components by modifying the form, nature, or format of information in a signal, while one or more elements of the information in the signal are nevertheless conveyed in a manner that can be recognized by the second component.

As used herein, the term "communication device" generally includes a transceiver, and/or other devices for communicating with other devices directly or via a network, and/or a user interface for communicating with one or more users.

As used herein, the term "feature vector" refers to a vector containing multiple elements of information of a view cone.

As used herein, the term "view cone" refers to a visible cone range of a sensor in a scene. Due to perspective transformation, the view cone may be conical, pyramidal, frustoconical, etc. The scene inside the view cone is visible to the sensor, otherwise it is not visible to the sensor. In other words, the scene outside the view cone is not visible to the sensor.

As used herein, the term "cone vector" refers to a vector represented using the spherical/cylindrical/polar coordinate system.

As used herein, the term "concatenating the vectors" refers to concatenation of vectors along a single expanded dimension.

Nowadays, object detection units use data from multiple sensors located in a region of interest (ROI) to obtain information about objects in the ROI. The data from the multiple sensors may require to be fused and represented in one common, coherent frame of reference to accurately obtain information about the objects in the ROI.

In some cases, raw data from the multiple sensors may be fused and then processed by the object detection units to obtain the information about the objects in the ROI. However, in some cases, there may be no obvious coherent way to fuse the raw data in one frame of reference, especially if the multiple sensors are of mixed modality. Further, the multiple sensors may not be synchronized perfectly or may not provide direct measurements. In addition, the raw data may have a very high data volume. Therefore, processing the raw data may require high computational, memory, and/or power resources. In some cases, the raw data may be compressed before fusion, however, the information which is discarded may not be available during/after the fusion. This may lead to loss of the information about the objects in the ROI and hence, the accuracy of the object detection units may be negatively affected.

In some other cases, the object detection units may fully process data from each of the multiple sensors at an individual object creation stage to generate a data indicative of a detected object and may then fuse such data from each of the multiple sensors to obtain the information about the objects in the ROI. However, in such cases, much of the information about the objects may be lost at the individual object creation stage, thereby making it difficult to recover the objects that are hard to detect by the multiple sensors individually.

Therefore, it may be advantageous to obtain information about the objects in the ROI with high accuracy, and with reduced computational, memory, and power resource requirements. Such improvements may become critical as the desire to obtain information about the objects in the ROI becomes more widespread.

The present disclosure provides an object detection system and a method for updating a cartesian representation of a region of interest (ROI).

The method includes receiving, by at least one sensor encoding neural network, a sensor point of view (POV) data. The sensor POV data is based on a sensor data generated by at least one sensor for a plurality of view cones. The method further includes generating, via the at least one sensor encoding neural network, a polar feature vector based on the sensor POV data. The polar feature vector includes a plurality of cone vectors corresponding to the plurality of view cones. The method further includes mapping, by a projection module, at least one cell from the plurality of cells of the cartesian representation with at least one cone vector from the plurality of cone vectors. The at least one cone vector corresponds to at least one view cone from the plurality of view cones. The method further includes receiving, by the projection module, at least one offset vector corresponding to the at least one cell. The at least one offset vector is based on a position of the at least one sensor relative to the at least one cell of the cartesian representation. The method further includes concatenating, via the projection module, at least the at least one cone vector and the at least one offset vector to generate at least one transformed tensor corresponding to the at least one cell. The method further includes generating, via a convolutional neural network, at least one learned output based on the at least one transformed tensor. The method further includes generating, via an object detection network, an updated cartesian representation based on the at least one learned output.

The object detection system of the present disclosure does not fuse raw data from the multiple sensors located in the ROI or fuse the fully processed data from each of the multiple sensors at the individual object creation stage to obtain the information about the objects in the ROI. Rather, the at least one sensor encoding neural network provides the polar feature vectors, which may describe the ROI in a higher-level representation. Therefore, the object detection system of the present disclosure may provide a learned data compression of the sensor data. This may prevent loss of important information about the objects in the ROI that may be required by the downstream modules, e.g., the projection module and the convolution neural network, for obtaining information about the objects in the ROI. Further, the projection module sequentially receives the polar feature vectors from the at least one sensor encoding neural network. Therefore, a volume of data to be transferred to the projection module may be substantially lower. Further, the convolutional neural network determines the at least one learned output based on an output of the projection module, and sequentially and iteratively updates the cartesian representation based on each polar feature vector. Since the cartesian representation is sequentially and iteratively updated based on each polar feature vector, the at least one sensor may further not require to be synchronized with another sensor and/or have to run at a same rate as another sensor.

Therefore, the important information from each of the multiple sensors can be retained which is otherwise lost when the fully processed data is fused to obtain the information about the objects in the ROI. Further, the computational effort for generating the polar feature vector is re-used as the projection module uses it to generate the at least one transformed tensor, which is further used to generate the at least one learned output for updating the cartesian representation. Therefore, the at least one learned output provides learned information corresponding to the at least one cell. In turn, the learned information allows adaptive mapping between the cone vectors and individual cells within a coverage area of the corresponding view cones. Thus, the cone vectors do not require to contain information related to any 3D measurements (e.g., a distance/depth) which may be otherwise required for a common projection into a cartesian space (e.g., camera information) and/or information about a larger region in the cartesian space that maps to more than one location (e.g., information about occluded or visible regions). This is in stark contrast to conventional methods of rigid transformation where information of view cones is projected using one or more static rules that are not adaptive to the information of the view cones that are to be projected.

Further, the object detection system of the present disclosure may provide the updated cartesian representation irrespective of the number and type of sensors located in the ROI. For example, the sensors may include light detection and ranging (LIDAR) sensors, radio detection and ranging (RADAR) sensors, sound navigation and ranging (SONAR) sensors, camera data sensors, or a combination thereof, which provide the information about the objects and their locations in a common representation. The updated cartesian representation may provide perception outputs in real world coordinates. The perception outputs may be referenceable to the position of the sensors.

Furthermore, the object detection system provides a scalable solution for obtaining information about the objects in the ROI as the object detection system may employ any number of sensors without significantly increasing computational requirements. This is because the sensor data from the multiple sensors is processed independently. On the other hand, as some of the conventional object detection units fuse the raw data, the computing requirements may significantly increase upon addition of sensors.

Further, the object detection system of the present disclosure may provide a solution having a reduced complexity for projecting the sensor POV data that is a polar sensor data (i.e., a spherical projection or a cylindrical projection of the sensor data) into the cartesian representation.

The polar feature vector may provide an efficient encoding of the sensor POV data for the projection module. Specifically, the sensor POV data may represent the coverage area of the at least one sensor adequately and hence, enable the convolution neural network to learn how to represent the polar feature vector into the cartesian representation efficiently. Further, as the sensor POV data represents the coverage area of the at least one sensor, the sensor POV data may also allow optimal processing of the information of any object disposed in the coverage area of the at least one sensor. This may prevent inconsistent information (e.g., a false detection) about the objects in the ROI.

Referring now to figures, FIG. 1 illustrates a schematic block diagram of an object detection system 100, according to an embodiment of the present disclosure.

The object detection system 100 includes at least one sensor 110. The at least one sensor 110 is configured to generate a sensor data 112 for a plurality of view cones 115 (shown in FIG. 2). In some embodiments, a resolution of the at least one sensor 110 may be based on application attributes. For example, the at least one sensor 110 may have a resolution of 256 view cones and 256 feature channels for each view cone 115. In some embodiments, the sensor data 112 may be a three-dimensional data. In the illustrated embodiment of FIG. 1, the at least one sensor 110 includes one sensor 110. In some other embodiments, the at least one sensor 110 may include a plurality of sensors 110. In some embodiments, the plurality of sensors 110 may include any number and type of sensors, as per desired application attributes.

In some embodiments, the at least one sensor 110 includes a light detection and ranging (LIDAR) sensor. In some embodiments, the sensor data 112 includes point cloud data. In some other embodiments, the at least one sensor 110 may include one or more cameras, or the like. In some embodiments, the sensor data 112 includes image data. In some other embodiments, the at least one sensor 110 may include a radio detection and ranging (RADAR) sensor, a sound navigation and ranging (SONAR) sensor, or a combination thereof.

The object detection system 100 further includes at least one sensor encoding neural network 120. In some embodiments, the at least one sensor encoding neural network 120 may be implemented in a computing device A. In some embodiments, the at least one sensor encoding neural network 120 is communicably coupled to the at least one sensor 110. Specifically, in some embodiments, the computing device A is communicably coupled to the at least one sensor 110. In some embodiments, the computing device A may include a system-on-chip (SOC), a computer processing unit (CPU), a graphical processing unit (GPU), a tensor processing unit (TPU), a neuromorphic chip, a vector accelerator, or any other processing system.

Examples of the computing device A may include a personal computer (PC), a laptop, a tablet, a touch pad, a portable computer, a handheld computer, a palmtop computer, a personal digital assistant (PDA), a smart device (e.g., smart phone, smart tablet, or smart mobile television), a mobile internet device (MID), a data communication device, a server, a desktop computer, an edge computing device, and so forth. In some examples, the computing device A also may include devices that are configured to be worn by a person. In some embodiments, the computing device A may be capable of executing other applications, as well as voice communications and/or data communications.

The at least one sensor encoding neural network 120 is configured to receive a sensor point of view (POV) data 122. The sensor POV data 122 is based on the sensor data 112. In some embodiments, the sensor POV data 122 is a spherical projection or a cylindrical projection of the sensor data 112. The at least one sensor encoding neural network 120 is further configured to generate a polar feature vector 124 based on the sensor POV data 122. In some embodiments, the at least one sensor encoding neural network 120 is a deep learning-based feature extraction neural network. In some embodiments, the at least one sensor encoding neural network 120 is a convolutional neural network. In some embodiments, the polar feature vector 124 based on the sensor POV data 122 generated by the at least one sensor encoding neural network 120 is a mid-level representation of the sensor data 112. In some embodiments, the polar feature vector 124 generated by the at least one sensor encoding neural network 120 is a one-dimensional vector of vectors. In some cases, the vectors may be one dimensional. In some other cases, the vectors may be multi-dimensional.

In some embodiments, the object detection system 100 further includes a sensor polar encoding module 105 configured to generate the sensor POV data 122 based on the sensor data 112. In the illustrated embodiment of FIG. 1, the sensor polar encoding module 105 is implemented in the computing device A. However, in some other embodiments, the sensor polar encoding module 105 may be implemented in the at least one sensor 110 or any other computing device. In some embodiments, the sensor polar encoding module 105 may be a locally attached edge computing device. In some embodiments, the sensor polar encoding module 105 may perform various processing functions, for example, a re-projection, a channel normalization, encode point locations in relation to a ground, etc., to generate the sensor POV data 122 based on the sensor data 112. In some embodiments, the sensor polar encoding module 105 may further accumulate or bin the sensor data 112 into a fixed size representation of the sensor data 112 to generate the sensor POV data 122, such that the at least one sensor encoding neural network 120 can operate on the sensor POV data 122 to generate the polar feature vector 124.

The object detection system 100 further includes a projection module 130. In some embodiments, the projection module 130 is implemented in a computing device B. In some embodiments, the computing device B may have lower power, storage, and/or computational resources than the computing device A as the computing device A operates at higher resolutions. The projection module 130 is communicably coupled to the at least one sensor encoding neural network 120. Specifically, the computing device B is communicably coupled to the computing device A. The projection module 130 is configured to generate at least one transformed tensor 140. The projection module 130 and the at least one transformed tensor 140 will be described in more detail below.

The object detection system 100 further includes a convolutional neural network 150 communicably coupled to the projection module 130. In the illustrated embodiment of FIG. 1, the convolutional neural network 150 is also implemented in the computing device B. However, in some other embodiments, the convolutional neural network 150 may be implemented in a separate computing device. The convolutional neural network 150 is configured to generate at least one learned output 160 based on the at least one transformed tensor 140.

In some embodiments, the at least one sensor encoding neural network 120 and the convolutional neural network 150 may be co-trained. In some other embodiments, the at least one sensor encoding neural network 120 and the convolutional neural network 150 may be separately trained. In some embodiments, the at least one sensor encoding neural network 120 may be pre-trained by a generic and supervised or unsupervised training model. In some embodiments, the convolutional neural network 150 may be trained by a sensor specific or a sensor location specific training model. In some other embodiments, the convolutional neural network 150 may also be trained by the generic and supervised or unsupervised training model.

The object detection system 100 further includes an object detection network 170 communicably coupled to the convolutional neural network 150. In the illustrated embodiment of FIG. 1, the object detection network 170 is also implemented in the computing device B. However, in some other embodiments, the object detection network 170 may be implemented in a separate computing device. In some embodiments, the object detection network 170 is configured to provide one or more perception outputs 190.

The various components of the object detection system 100 will be described in more detail below.

Figure 2:
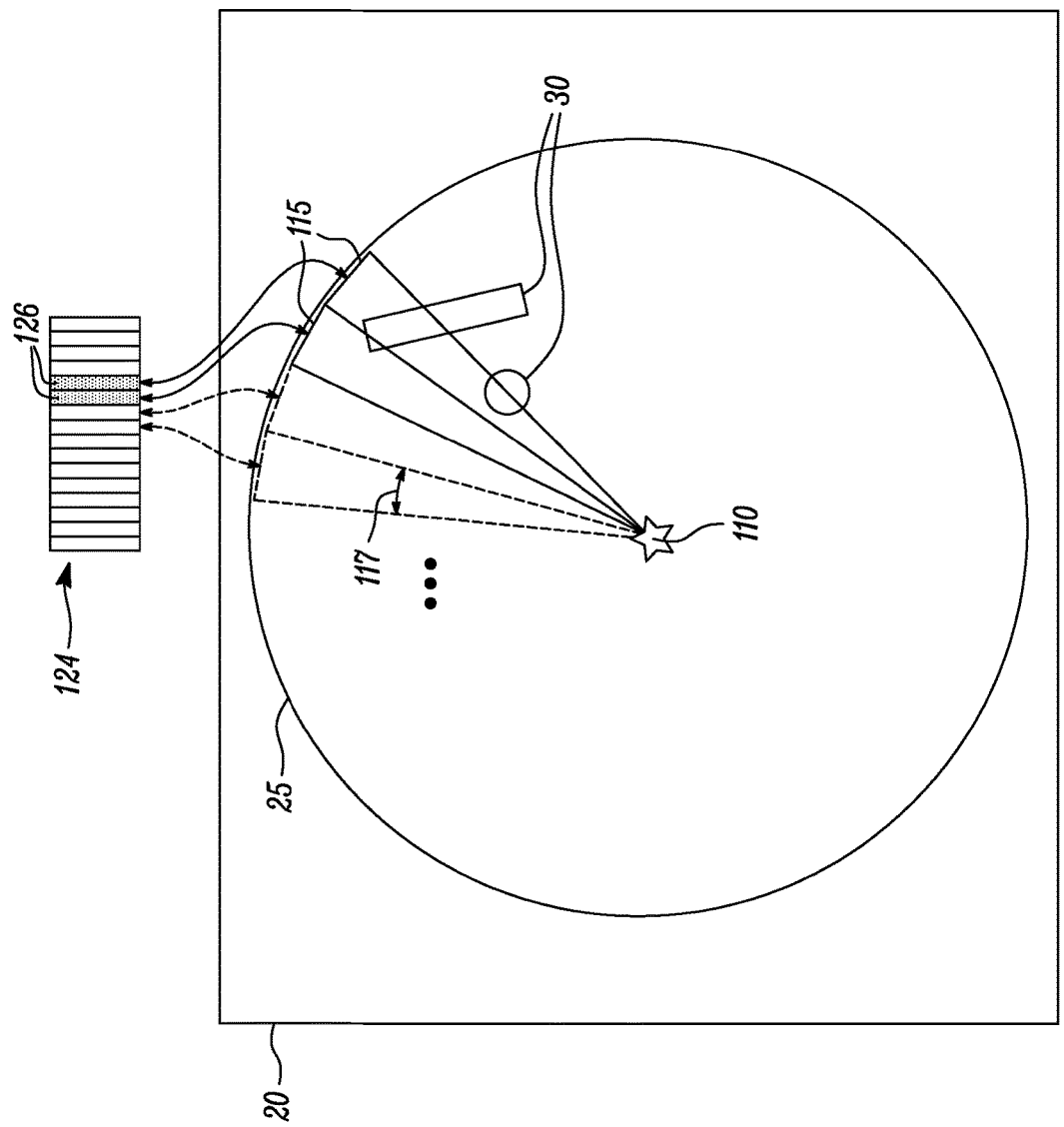
FIG. 2 illustrates a schematic diagram of a sensor disposed in a region of interest (ROI), according to an embodiment of the present disclosure.

FIG. 2 illustrates a schematic diagram of the at least one sensor 110 disposed in a region of interest (ROI) 20, according to an embodiment of the present disclosure. In some examples, the ROI 20 may represent a part of a floor area in a building, such as a food court of a building complex. The ROI 20 includes one or more objects 30.

Figure 3B:
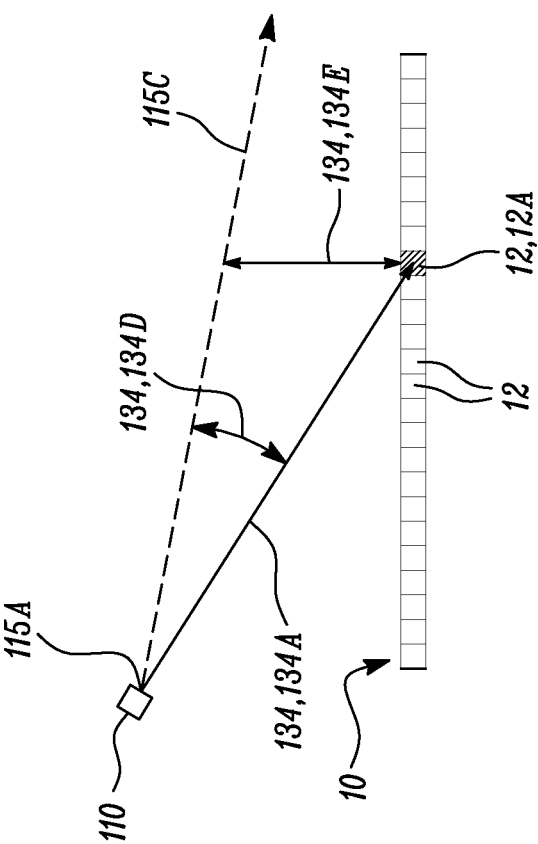
FIG. 3B illustrates a schematic side view of the cartesian representation of the ROI, according to an embodiment of the present disclosure.
Figure 3A:
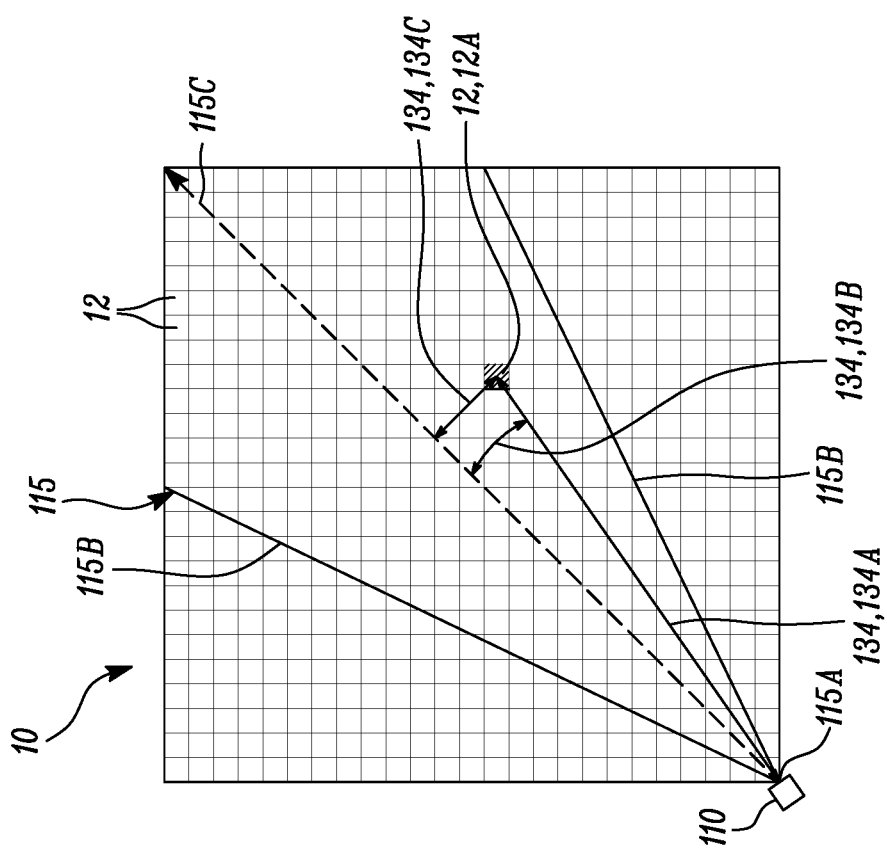
FIG. 3A illustrates a schematic top view of a cartesian representation of the ROI, according to an embodiment of the present disclosure.
Figure 8:
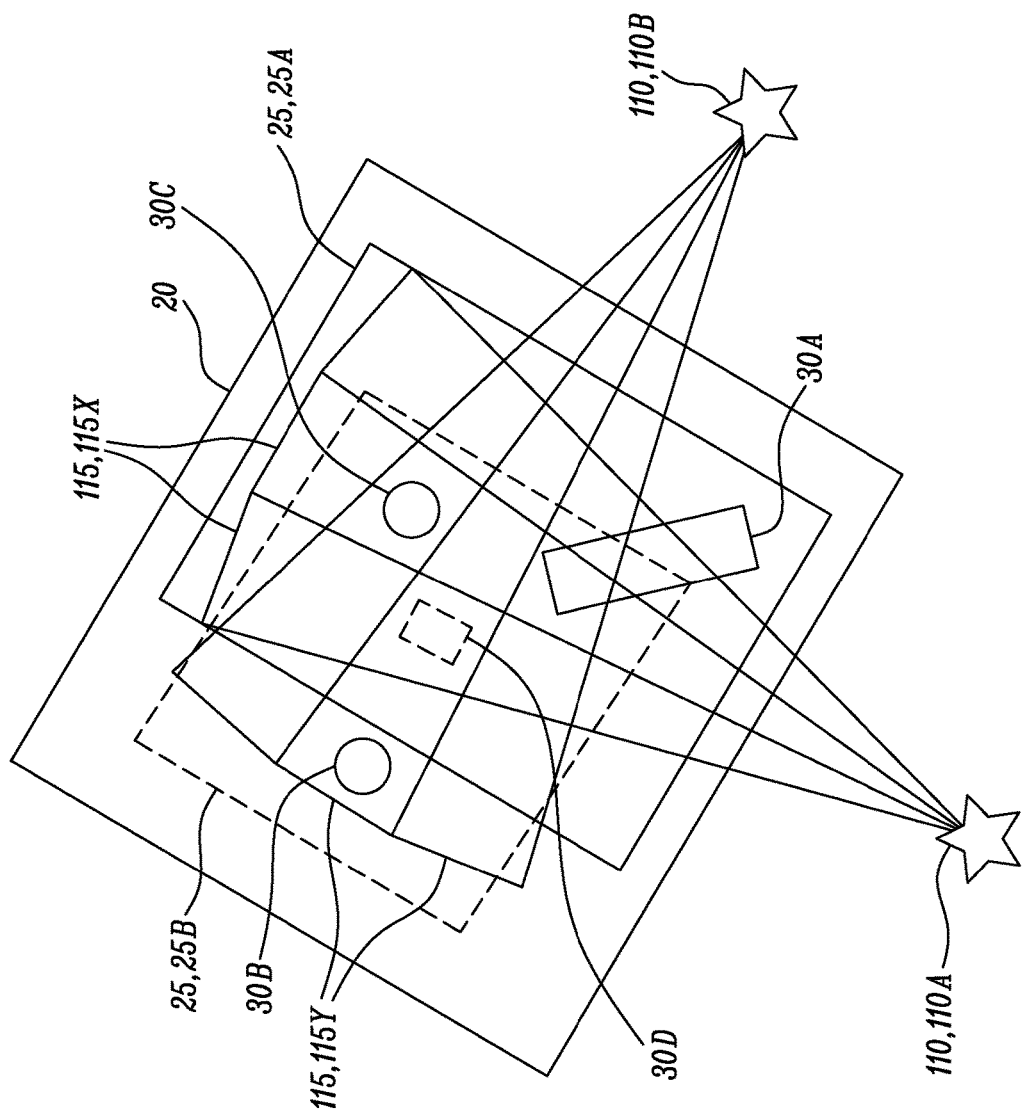
FIG. 8 illustrates a schematic diagram of multiple sensors disposed in the ROI, according to an embodiment of the present disclosure.

The ROI 20 may be represented by a cartesian representation 10 (shown in FIG. 3A). In some embodiments, the ROI 20 may be in motion, for example, the at least one sensor 110 may be mounted on a moving vehicle. In some embodiments, the moving vehicle may be an autonomous vehicle. In some other embodiments, the at least one sensor 110 may be moving relative to each another sensor 110. In some embodiments, the plurality of sensors 110 may be disposed in the ROI 20 in a distributed manner as shown in FIG. 8.

The at least one sensor 110 covers at least a portion 25 of the ROI 20. Referring to FIGS. 1 and 2, in some embodiments, the object detection system 100 is configured to generate the perception outputs 190 about the one or more objects 30 in the ROI 20. In some embodiments, the one or more perception outputs 190 may include object detection, semantic segmentation, such as object boundaries and pose estimation, or any other information about the one or more objects 30 in the ROI 20.

The at least one sensor 110 is configured to generate the sensor data 112 for the plurality of view cones 115. In some embodiments, each of the plurality of view cones 115 is defined at least by an angular range 117 about the at least one sensor 110. In some other embodiments, each of the plurality of view cones 115 is defined at least by the angular range 117 about the at least one sensor 110 and height ranges (not shown). In the illustrated embodiment of FIG. 2, a birds-eye view of the ROI 20 is shown, therefore the angular range 117 is horizontal. In other words, each of the plurality of view cones 115 cover all of the volume and ground surface area within a slice of a horizontal field of view (FOV) of the at least one sensor 110. Further, in the illustrated embodiment of FIG. 2, the at least one sensor 110 is a 360 degrees LIDAR sensor. However, in some other cases, the at least one sensor 110 may not have a 360 degrees coverage.

The polar feature vector 124 includes a plurality of cone vectors 126 corresponding to the plurality of view cones 115. In other words, each cone vector 126 of the polar feature vector 124 corresponds to a view cone 115 from the plurality of view cones 115. The polar feature vector 124 is therefore a vector of vectors. In some embodiments, the polar feature vector 124 has a size N×M, such that N is a total number of the plurality of view cones 115 and M is a size of each cone vector 126. Each cone vector 126 includes the semantic information of the corresponding view cone 115 from the plurality of view cones 115. Therefore, the object detection system 100 encodes the sensor POV data 122 into the polar feature vector 124. Specifically, the at least one sensor encoding neural network 120 encodes the sensor POV data 122 into the polar feature vector 124 which may describe the ROI 20 in the higher-level representation than the sensor POV data 122.

FIG. 3A illustrates a schematic top view of the cartesian representation 10 of the ROI 20 shown in FIG. 2, according to an embodiment of the present disclosure. In some embodiments, the cartesian representation 10 is a two-dimensional cartesian representation of the ROI 20. In some embodiments, the cartesian representation 10 is a map-like or a birds-eye representation of the ROI 20. The cartesian representation 10 includes a plurality of cells 12. The plurality of cells 12 includes rows and columns of cells 12. FIG. 3B illustrates a schematic side view of the cartesian representation 10 of the ROI 20, according to an embodiment of the present disclosure. In some embodiments, the cells 12 may have a regular size in order to indicate discrete positions in the cartesian representation 10 of the ROI 20.

Referring to FIGS. 3A and 3B, the at least one sensor 110 and one of the plurality of view cones 115 are also illustrated. FIGS. 3A and 3B further illustrate a position of the at least one sensor 110 relative to the at least one cell 12 of the cartesian representation 10. The position of the at least one sensor 110 relative to the at least one cell 12 of the cartesian representation 10 is defined based on one or more offset parameters 134 for the at least one cell 12. Further, the one or more offset parameters 134 indicating the position of the at least one sensor 110 relative to the at least one cell 12 of the cartesian representation 10 of the ROI 20 are known. In some cases, the one or more offset parameters 134 may not substantially change over time. In other words, the one or more offset parameters 134 may be hardcoded. In some other cases, the one or more offset parameters 134 may change over time. In some cases, the one or more offset parameters 134 may be monitored and/or updated periodically.

In the illustrated example of FIGS. 3A and 3B, the one or more offset parameters 134 define the position of the at least one sensor 110 relative to a cell 12A of the cartesian representation 10.

In some embodiments, the one or more offset parameters 134 include a relative distance 134A from the cell 12A to the at least one sensor 110. Specifically, the relative distance 134A is a distance from a view cone origin 115A to the cell 12A. In some embodiments, the relative distance 134A may be normalized according to a maximum distance (not shown) from the view cone origin 115A to the cells 12.

In some embodiments, the one or more offset parameters 134 further include a relative angular offset 134B of the cell 12A from a view cone center line 115C passing through a center of the view cone 115. Specifically, the view cone center line 115C passes through a center of the view cone 115 defined between view cone edges 115B. In some embodiments, the relative angular offset 134B may be normalized using an absolute angle (in radians) and/or according to the angular range 117 (shown in FIG. 2) of the corresponding view cone 115.

In some embodiments, the one or more offset parameters 134 further include a lateral distance offset 134C of the cell 12A from the view cone center line 115C.

In some embodiments, the one or more offset parameters 134 may additionally include a vertical cell center angular offset 134D of the cell 12A from the view cone center line 115C. In some embodiments, the vertical cell center angular offset 134D may be an absolute angle (in radians) and/or normalized according to a pose of the at least one sensor 110.

In some embodiments, the one or more offset parameters 134 may additionally include a vertical distance 134E of the cell 12A from the view cone center line 115C. The cell 12A is defined to be at a ground/floor level of the cartesian representation 10. The vertical distance 134E may be absolute or normalized according to a maximum distance (not shown) of the at least one sensor 110 from the ground/floor level.

Figure 4:
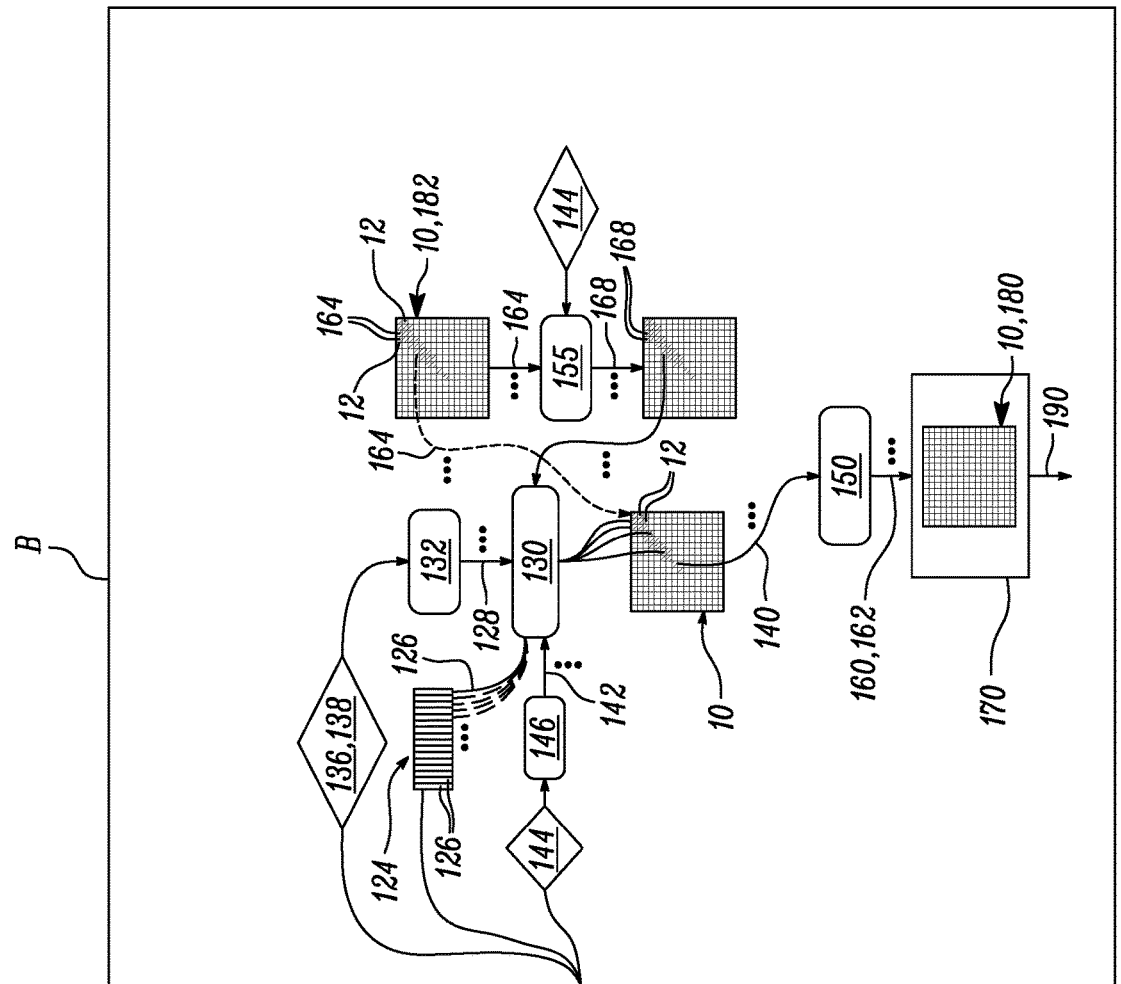
FIG. 4 illustrates a detailed schematic block diagram of the object detection system for updating the cartesian representation of the ROI, according to an embodiment of the present disclosure.
Figure 4:
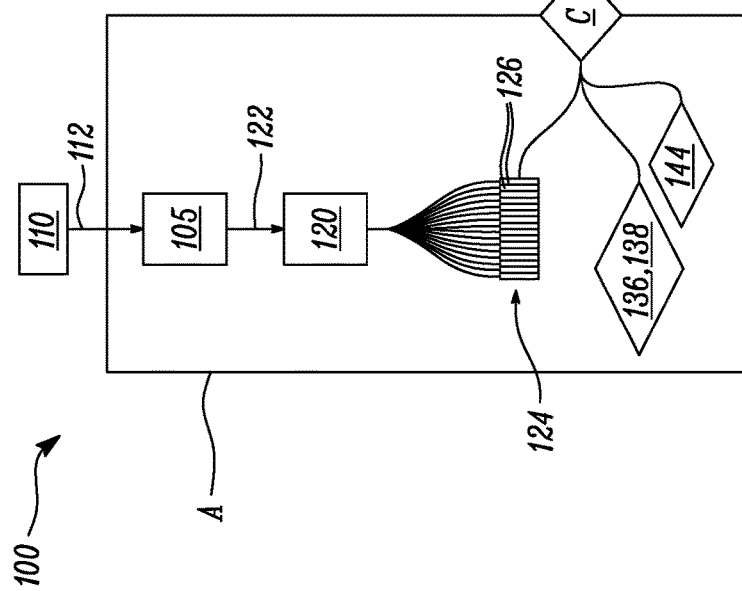

FIG. 4 illustrates a detailed schematic block diagram of the object detection system 100 for updating the cartesian representation 10 of the ROI 20 shown in FIG. 2, according to an embodiment of the present disclosure.

The object detection system 100 includes the at least one sensor 110, the at least one sensor encoding neural network 120, the projection module 130, the convolutional neural network 150, and the object detection network 170.

In the illustrated embodiment of FIG. 4, the at least one sensor encoding neural network 120 is implemented in the computing device A and the projection module 130, the convolutional neural network 150, and the object detection network 170 are implemented in the computing device B. In some embodiments, the object detection system 100 may further include a communication device C for transferring data (e.g., the polar feature vector 124) from the computing device A to the computing device B.

The projection module 130 is configured to map at least one cell 12 from the plurality of cells 12 of the cartesian representation 10 with at least one cone vector 126 from the plurality of cone vectors 126. The at least one cone vector 126 corresponds to at least one view cone 115 (shown in FIG. 2) from the plurality of view cones 115.

The projection module 130 is further configured to receive at least one offset vector 128 corresponding to the at least one cell 12. Each offset vector 128 of the at least one offset vector 128 corresponds to the at least one cell 12. The at least one offset vector 128 is based on the position of the at least one sensor 110 relative to the at least one cell 12 of the cartesian representation 10.

In some embodiments, the object detection system 100 includes further includes an offset encoding module 132. In the illustrated embodiment of FIG. 4, the offset encoding module 132 is implemented in the computing device B. However, in some other embodiments, the offset encoding module 132 may be implemented in the computing device A. In some other embodiments, the offset encoding module 132 may be implemented in any other computing device communicably coupled to the computing device B.

In some embodiments, the offset encoding module 132 is configured to generate the at least one offset vector 128 based on the one or more offset parameters 134 (shown in FIGS. 3A and 3B) corresponding to the at least one cell 12. In some embodiments, the one or more offset parameters 134 are further based on one or more sensor parameters 136 indicative of the position of the at least one sensor 110 relative to the at least one cell 12. In some embodiments, the one or more sensor parameters 136 include parameters related to sensor coverage, i.e., the plurality of view cones 115 (shown in FIG. 2) and the angular range 117 (shown in FIG. 2) of the at least one sensor 110, a location and a relative pose of the at least one sensor 110 with respect to the ROI 20, and the like.

In some embodiments, the at least one offset vector 128 is generated further based on one or more sensor performance parameters 138. In some embodiments, the one or more sensor performance parameters 138 are indicative of a performance of the at least one sensor 110. The performance of the at least one sensor 110 includes, for example, but not limited to, a performance of the at least one sensor 110 for different view cones from the plurality of view cones 115, a coverage density of the at least one sensor 110 for the position and/or different view cones, an expected return strength (e.g., the return strength of a light ray that generates the sensor data 112) of the at least one sensor 110 for the position and/or different view cones, an expected noise of the at least one sensor 110 for the position and/or different view cones, and so forth.

In the illustrated embodiment of FIG. 4, the at least one cell 12 includes the plurality of cells 12 and the at least one cone vector 126 includes the plurality of cone vectors 126. Specifically, the projection module 130 of FIG. 4 is configured to map the plurality of cells with the least one cone vector 126.

Further, the at least one offset vector 128 includes a plurality of offset vectors 128 corresponding to the plurality of cells 12. Specifically, the projection module 130 of FIG. 4 is configured to receive the plurality of offset vectors 128 corresponding to the plurality of cells 12.

In some embodiments, the projection module 130 is further configured to receive at least one timing vector 142 corresponding to the at least one cell 12. Each timing vector 142 of the at least one timing vector 142 corresponds to the at least one cell 12. The at least one timing vector 142 is indicative of a time instance when the sensor data 112 for the at least one view cone 115 (shown in FIG. 2) is generated.

In some embodiments, the object detection system 100 further includes a timing encoding module 146. In the illustrated embodiment of FIG. 4, the timing encoding module 146 is implemented in the computing device B. However, in some other embodiments, the timing encoding module 146 may be implemented in the computing device A. In some other embodiments, the timing encoding module 146 may be implemented in any other computing device communicably coupled to the computing device B.

In some embodiments, the timing encoding module 146 is configured to generate the at least one timing vector 142 based on a timing information 144 corresponding to the at least one cell 12. In some embodiments, the timing information 144 is indicative of the time instance when the sensor data 112 for the at least one view cone 115 is generated.

In the illustrated embodiment of FIG. 4, the at least one timing vector 142 includes a plurality of timing vectors 142 corresponding to the plurality of cells 12. Specifically, the projection module 130 of FIG. 4 is configured to receive the plurality of timing vectors 142 corresponding to the plurality of cells 12.

In some embodiments, the projection module 130 is further configured to receive at least one previous cell feature vector 164 of a previously updated cartesian representation 182 corresponding to the at least one cell 12.

In the illustrated embodiment of FIG. 4, the at least one previous cell feature vector 164 includes a plurality of previous cell feature vectors 164 corresponding to the plurality of cells 12. Specifically, the projection module 130 of FIG. 4 is configured to receive the plurality of previous cell feature vectors 164 corresponding to the plurality of cells 12.

The projection module 130 is further configured to concatenate at least the at least one cone vector 126 and the at least one offset vector 128 to generate at least one transformed tensor 140 corresponding to the at least one cell 12. Specifically, the projection module 130 is configured to concatenate at least the at least one cone vector 126 and the at least one offset vector 128 along a single expanded dimension to generate the at least one transformed tensor 140.

In some embodiments, the at least one transformed tensor 140 is generated by further concatenating the at least one timing vector 142 with the at least one cone vector 126 and the at least one offset vector 128.

In some embodiments, the at least one transformed tensor 140 is generated by further concatenating the at least one previous cell feature vector 164 with the at least one cone vector 126 and the at least one offset vector 128.

In some embodiments, the at least one transformed tensor 140 is generated by further concatenating the at least one previous cell feature vector 164 with the at least one cone vector 126, the at least one offset vector 128, and the at least one timing vector 142.

In some embodiments, the at least one transformed tensor 140 includes a plurality of transformed tensors 140 corresponding to the plurality of cells 12. Specifically, the projection module 130 is configured to concatenate the plurality of cone vectors 126 and the plurality of offset vectors 128 to generate the plurality of transformed tensors 140 corresponding to the plurality of cells 12.

In some other embodiments, the projection module 130 is configured to concatenate the plurality of cone vectors 126, the plurality of offset vectors 128, and the plurality of timing vectors 142 to generate the plurality of transformed tensors 140 corresponding to the plurality of cells 12.

In some other embodiments, the projection module 130 is configured to concatenate the plurality of cone vectors 126, the plurality of offset vectors 128, and the plurality of previous cell feature vectors 164 to generate the plurality of transformed tensors 140 corresponding to the plurality of cells 12.

In some other embodiments, the projection module 130 is configured to concatenate the plurality of cone vectors 126, the plurality of offset vectors 128, the plurality of timing vectors 142, and the plurality of previous cell feature vectors 164 to generate the plurality of transformed tensors 140 corresponding to the plurality of cells 12.

As discussed above, the convolutional neural network 150 is configured to generate the at least one learned output 160 based on the at least one transformed tensor 140. Subsequently, the object detection network 170 is configured to generate an updated cartesian representation 180 based on the at least one learned output 160.

In the illustrated embodiment of FIG. 4, the at least one learned output 160 includes a plurality of learned cell feature vectors 162 corresponding to the plurality of cells 12. Specifically, the convolutional neural network 150 is configured to generate the plurality of learned cell feature vectors 162 corresponding to the plurality of cells 12 based on the plurality of transformed tensors 140.

Therefore, the convolutional neural network 150 decodes the polar feature vector 124 into the at least one learned output 160. Specifically, the convolutional neural network 150 decodes the polar feature vector 124, which may describe the ROI 20 (shown in FIG. 2) in the higher level representation, into the at least one learned output 160 which is used to generate the updated cartesian representation 180. The updated cartesian representation 180 is further used to provide the one or more perception outputs 190 for the ROI 20.

In the illustrated embodiment of FIG. 4, the object detection network 170 is further configured to replace the plurality of previous cell feature vectors 164 corresponding to the plurality of cells 12 with the plurality of learned cell feature vectors 162 to generate the updated cartesian representation 180. Further, the object detection network 170 is configured to provide the one or more perception outputs 190 for the ROI 20 using the updated cartesian representation 180 of the ROI 20. In some embodiments, the object detection network 170 may postprocess the updated cartesian representation 180 to provide the one or more perception outputs 190. For example, the object detection network 170 may apply tracking functions to provide the one or more perception outputs 190.

In some embodiments, the object detection system 100 further includes a state adaptation module 155. In some embodiments, the state adaptation module 155 may be implemented in the computing device B. In some other embodiments, the state adaptation module 155 may be implemented in a separate computing device. In some embodiments, the state adaptation module 155 is a convolutional neural network. However, in some other embodiments, the state adaptation module 155 may not be a convolutional neural network.

In some embodiments, the state adaptation module 155 is configured to receive the at least one previous cell feature vector 164 of the previously updated cartesian representation 182 corresponding to the at least one cell 12. In some embodiments, the state adaptation module 155 is configured to adjust the at least one previous cell feature vector 164 to generate at least one adapted previous cell feature vector 168.

In some embodiments, the state adaptation module 155 is configured to adjust the at least one previous cell feature vector 164 by multiplying a magnitude of the at least one previous cell feature vector 164 by a scalar value to generate the at least one adapted previous cell feature vector 168. In some embodiments, the scalar value is greater than zero and less than 1.

In some other embodiments, the state adaptation module 155 is further configured to receive the timing information 144 for the at least one cell 12. In some embodiments, the state adaptation module 155 is configured to adjust the at least one previous cell feature vector 164 by multiplying a magnitude of the at least one previous cell feature vector 164 by a scalar decay value to generate the at least one adapted previous cell feature vector 168. In some embodiments, the scalar decay value is based on a time elapsed since a generation of the previously updated cartesian representation 182. In some embodiments, the scalar decay value is equal to the scalar value raised to the power of the time elapsed.

In some embodiments, the at least one adapted previous cell feature vector 168 includes a plurality of adapted previous cell feature vectors 168 corresponding to the plurality of cells 12. Specifically, the projection module 130 of FIG. 4 is configured to receive the plurality of adapted previous cell feature vectors 168 corresponding to the plurality of cells 12.

In some embodiments, the at least one transformed tensor 140 is generated by further concatenating the at least one adapted previous cell feature vector 168 with the at least one cone vector 126 and the at least one offset vector 128. Specifically, in some embodiments, the at least one transformed tensor 140 is generated by further concatenating the at least one adapted previous cell feature vector 168 instead of the at least one previous cell feature vector 164.

In some embodiments, the projection module 130 is configured to concatenate the plurality of cone vectors 126, the plurality of offset vectors 128, and the plurality of adapted previous cell feature vectors 168 to generate the plurality of transformed tensors 140 corresponding to the plurality of cells 12. In the illustrated embodiment of FIG. 4, the projection module 130 is configured to concatenate the plurality of cone vectors 126, the plurality of offset vectors 128, the plurality of timing vectors 142, and the plurality of adapted previous cell feature vectors 168 to generate the plurality of transformed tensors 140 corresponding to the plurality of cells 12.

Figure 5:
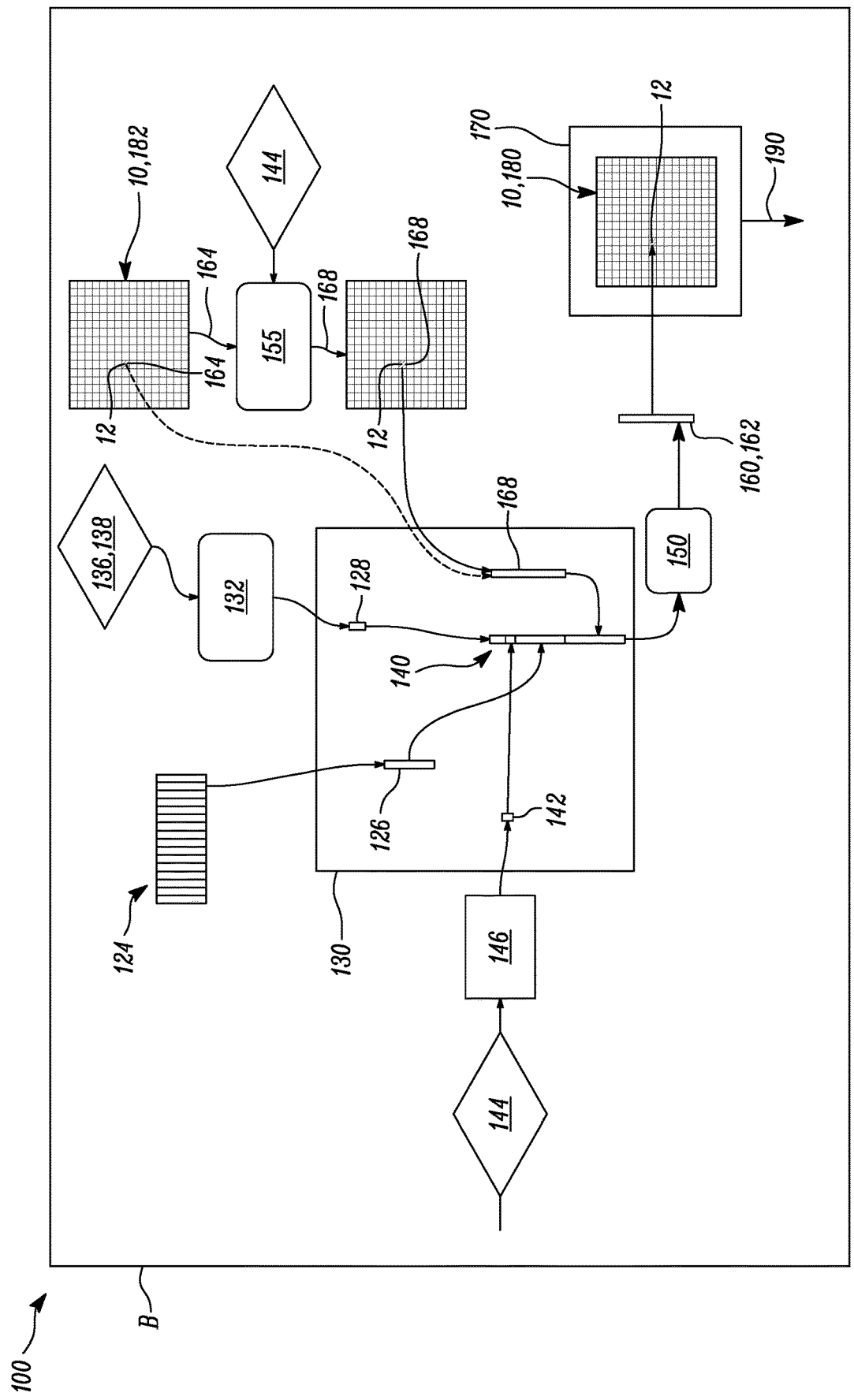
FIG. 5 illustrates a detailed schematic block diagram of the object detection system for updating the cartesian representation of the ROI, according to another embodiment of the present disclosure.

FIG. 5 illustrates a detailed schematic block diagram of the object detection system 100 for updating the cartesian representation 10 of the ROI 20 shown in FIG. 2, according to another embodiment of the present disclosure.

The object detection system 100 illustrated in FIG. 5 is substantially similar to the object detection system 100 illustrated in FIG. 4. A few common components of the object detection system 100 are not shown in FIG. 5 for clarity purposes. Specifically, the at least one sensor 110 and the at least one sensor encoding neural network 120 implemented in the computing device A are not shown in FIG. 5. The components of the object detection system 100 implemented in the computing device B are shown in FIG. 5. Specifically, the projection module 130, the convolutional neural network 150, and the object detection network 170 are shown in FIG. 5.

In the illustrated embodiment of FIG. 5, the at least one cell 12 includes one cell 12 and the at least one cone vector 126 includes one cone vector 126 corresponding to the one cell 12.

In the illustrated embodiment of FIG. 5, the at least one offset vector 128 includes one offset vector 128 corresponding to the one cell 12. Specifically, the projection module 130 of FIG. 5 is configured to receive the one offset vector 128 corresponding to the one cell 12.

In the illustrated embodiment of FIG. 5, the at least one timing vector 142 includes one timing vector 142 for the one cell 12. Specifically, the projection module 130 of FIG. 5 is configured to receive the one timing vector 142 corresponding to the one cell 12.

In the illustrated embodiment of FIG. 5, the at least one previous cell feature vector 164 includes one previous cell feature vector 164 corresponding to the one cell 12. Specifically, in some embodiments, the projection module 130 of FIG. 5 is configured to receive the one previous cell feature vector 164 corresponding to the one cell 12.

In some embodiments, the at least one adapted previous cell feature vector 168 includes one adapted previous cell feature vector 168 corresponding to the one cell 12. Specifically, the projection module 130 of FIG. 5 is configured to receive the one adapted previous cell feature vector 168 corresponding to the one cell 12.

In some embodiments, the at least one transformed tensor 140 includes one transformed tensor 140 corresponding to the one cell 12. Specifically, the projection module 130 is configured to concatenate the one cone vector 126 and the one offset vector 128 to generate the one transformed tensor 140 for the one cell 12.

In some other embodiments, the projection module 130 is configured to concatenate the one cone vector 126, the one offset vector 128, and the one timing vector 142 to generate the one transformed tensor 140 for the one cell 12.

In some other embodiments, the projection module 130 is configured to concatenate the one cone vector 126, the one offset vector 128, and the one previous cell feature vector 164 to generate the one transformed tensor 140 for the one cell 12.

In some other embodiments, the projection module 130 is configured to concatenate the one cone vector 126, the one offset vector 128, the one timing vector 142, and the one previous cell feature vector 164 to generate the one transformed tensor 140 for the one cell 12.

In the illustrated embodiment of FIG. 5, the projection module 130 is configured to concatenate the one cone vector 126, the one offset vector 128, the one timing vector 142, and the one adapted previous cell feature vector 168 to generate the one transformed tensor 140 for the one cell 12.

As discussed above, the convolutional neural network 150 is configured to generate the at least one learned output 160 based on the at least one transformed tensor 140. In the illustrated embodiment of FIG. 5, the at least one learned output 160 includes one learned cell feature vector 162 corresponding to the one cell 12. Specifically, the convolutional neural network 150 is configured to generate the one learned cell feature vector 162 based on the one transformed tensor 140. In this embodiment, the convolutional neural network 150 may include a multi-layer perceptron (MLP) structure.

In the illustrated embodiment of FIG. 5, the object detection network 170 is further configured to replace the one previous cell feature vector 164 corresponding to the one cell 12 with the one learned cell feature vector 162 to generate the updated cartesian representation 180.

Similarly, the object detection system 100 may update each cell of the one cone vector 126 one by one to generate the updated cartesian representation 180 of the ROI 20 (shown in FIG. 2). Further, the object detection system 100 may similarly update each cell of the plurality of cone vectors 126 of the polar feature vector 124 to generate the updated cartesian representation 180 of the ROI 20.

Figure 6:
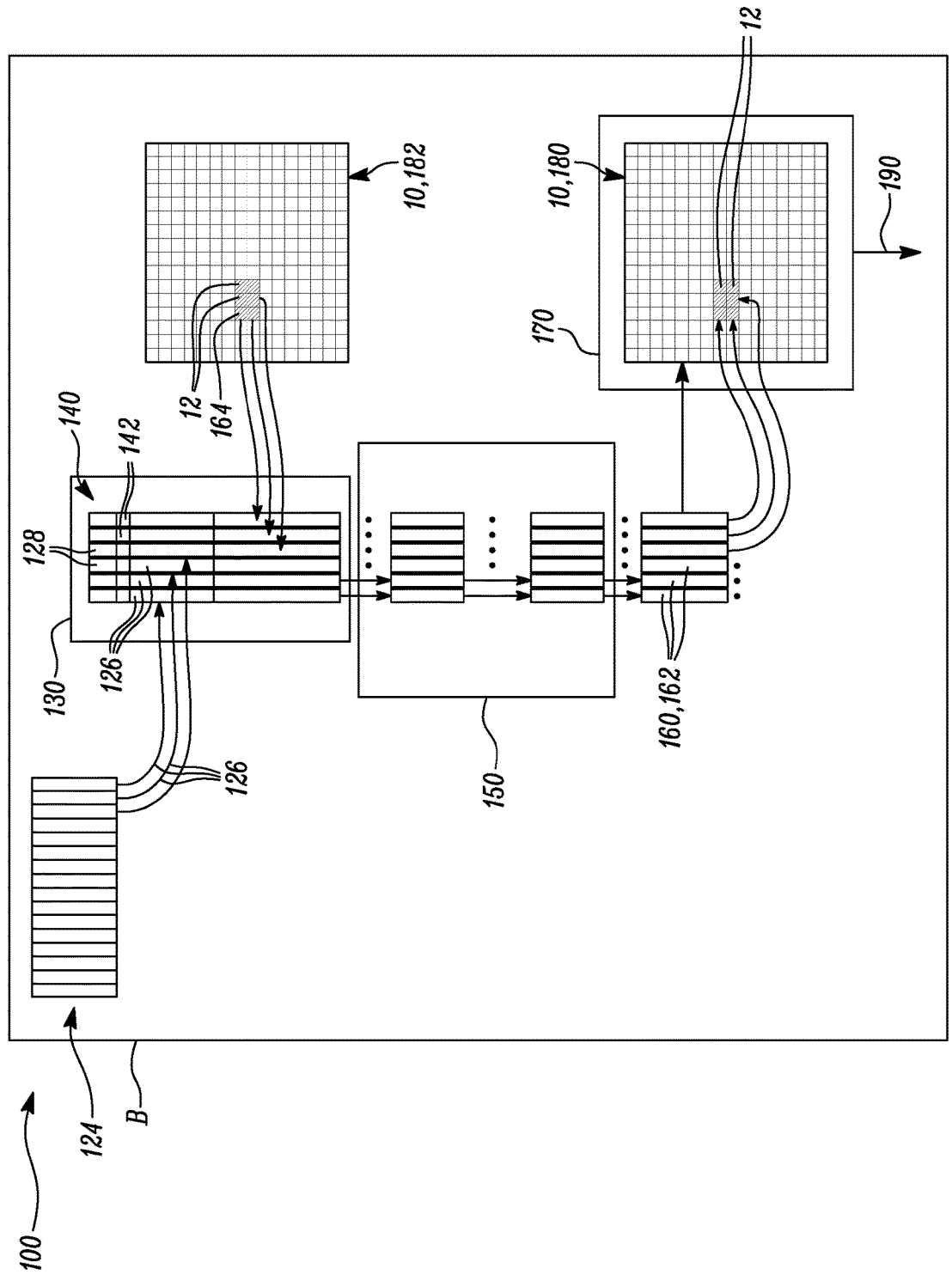
FIG. 6 illustrates a detailed schematic block diagram of the object detection system for updating the cartesian representation of the ROI, according to another embodiment of the present disclosure.

FIG. 6 illustrates a detailed schematic block diagram of the object detection system 100 for updating the cartesian representation 10 of the ROI 20 shown in FIG. 2, according to another embodiment of the present disclosure.

The object detection system 100 illustrated in FIG. 6 is substantially similar to the object detection system 100 illustrated in FIG. 5. A few common components of the object detection system 100 are not shown in FIG. 6 for clarity purposes. Specifically, the at least one sensor 110 and the at least one sensor encoding neural network 120 implemented in the computing device A are not shown in FIG. 5. The components of the object detection system 100 implemented in the computing device B are shown in FIG. 6. Specifically, the projection module 130, the convolutional neural network 150, and the object detection network 170 are shown in FIG. 6.

In the illustrated embodiment of FIG. 6, the at least one cell 12 includes a batch of cells 12. In the illustrated embodiment of FIG. 6, the batch of cells 12 includes six cells 12. The batch of cells 12 may include any number of cells 12 greater than one and less than a total number of the plurality of cells 12. Further, the at least one cone vector 126 may include one or more cone vectors 126 from the plurality of cone vectors 126 corresponding to the batch of cells 12.

In the illustrated embodiment of FIG. 6, the at least one offset vector 128 includes a batch of offset vectors 128 corresponding to the batch of cells 12. Specifically, the projection module 130 of FIG. 6 is configured to receive the batch of offset vectors 128 corresponding to the batch of cells 12.

In the illustrated embodiment of FIG. 6, the at least one timing vector 142 includes a batch of timing vectors 142 corresponding to the batch of cells 12. Specifically, the projection module 130 of FIG. 6 is configured to receive the batch of timing vectors 142 corresponding to the batch of cells 12.

In the illustrated embodiment of FIG. 6, the at least one previous cell feature vector 164 includes a batch of previous cell feature vectors 164 corresponding to the batch of cells 12. Specifically, the projection module 130 of FIG. 6 is configured to receive the batch of previous cell feature vectors 164 corresponding to the batch of cells 12.

In some embodiments, the at least one adapted previous cell feature vector 168 (shown in FIG. 5) includes a batch of adapted previous cell feature vectors 168 corresponding to the batch of cells 12. Specifically, in some embodiments, the projection module 130 is configured to receive the batch of adapted previous cell feature vectors 168 corresponding to the batch of cells 12 instead of the batch of previous cell feature vectors 164.

In some embodiments, the at least one transformed tensor 140 includes a batch of transformed tensors 140 corresponding to the batch of cells 12. Specifically, the projection module 130 is configured to concatenate the batch of cone vectors 126 and the batch of offset vectors 128 to generate the batch of transformed tensors 140 corresponding to the batch of cells 12.

In some other embodiments, the projection module 130 is configured to concatenate the batch of cone vectors 126, the batch of offset vectors 128, and the batch of timing vectors 142 to generate the batch of transformed tensors 140 corresponding to the batch of cells 12.

In some other embodiments, the projection module 130 is configured to concatenate the batch of cone vectors 126, the batch of offset vectors 128, and the batch of previous cell feature vectors 164 to generate the batch of transformed tensors 140 corresponding to the batch of cells 12.

In the illustrated embodiment of FIG. 6, the projection module 130 is configured to concatenate the batch of cone vectors 126, the batch of offset vectors 128, the batch of timing vectors 142, and the batch of previous cell feature vectors 164 to generate the batch of transformed tensors 140 corresponding to the batch of cells 12.

In some other embodiments, the projection module 130 is configured to concatenate the batch of cone vectors 126, the batch of offset vectors 128, the batch of timing vectors 142, and the batch of adapted previous cell feature vectors 168 (shown in FIG. 5) to generate the batch of transformed tensors 140 corresponding to the batch of cells 12.

As discussed above, the convolutional neural network 150 is configured to generate the at least one learned output 160 based on the at least one transformed tensor 140. In the illustrated embodiment of FIG. 6, the at least one learned output 160 includes a batch of learned cell feature vectors 162 corresponding to the batch of cells 12. Specifically, the convolutional neural network 150 is configured to generate the batch of learned cell feature vectors 162 based on the batch of transformed tensors 140. In some embodiments, the convolutional neural network 150 is configured to process the batch of transformed tensors 140 corresponding to the batch of cells 12 in parallel using one dimensional convolutional kernels of size one.

In the illustrated embodiment of FIG. 6, the object detection network 170 is further configured to replace the batch of previous cell feature vectors 164 corresponding to the batch of cells 12 with the batch of learned cell feature vectors 162 to generate the updated cartesian representation 180.

Similarly, the object detection system 100 may update remaining cells 12 of the plurality of cone vectors 126 of the polar feature vector 124 in batches to generate the updated cartesian representation 180 of the ROI 20 (shown in FIG. 2).

Figure 7:
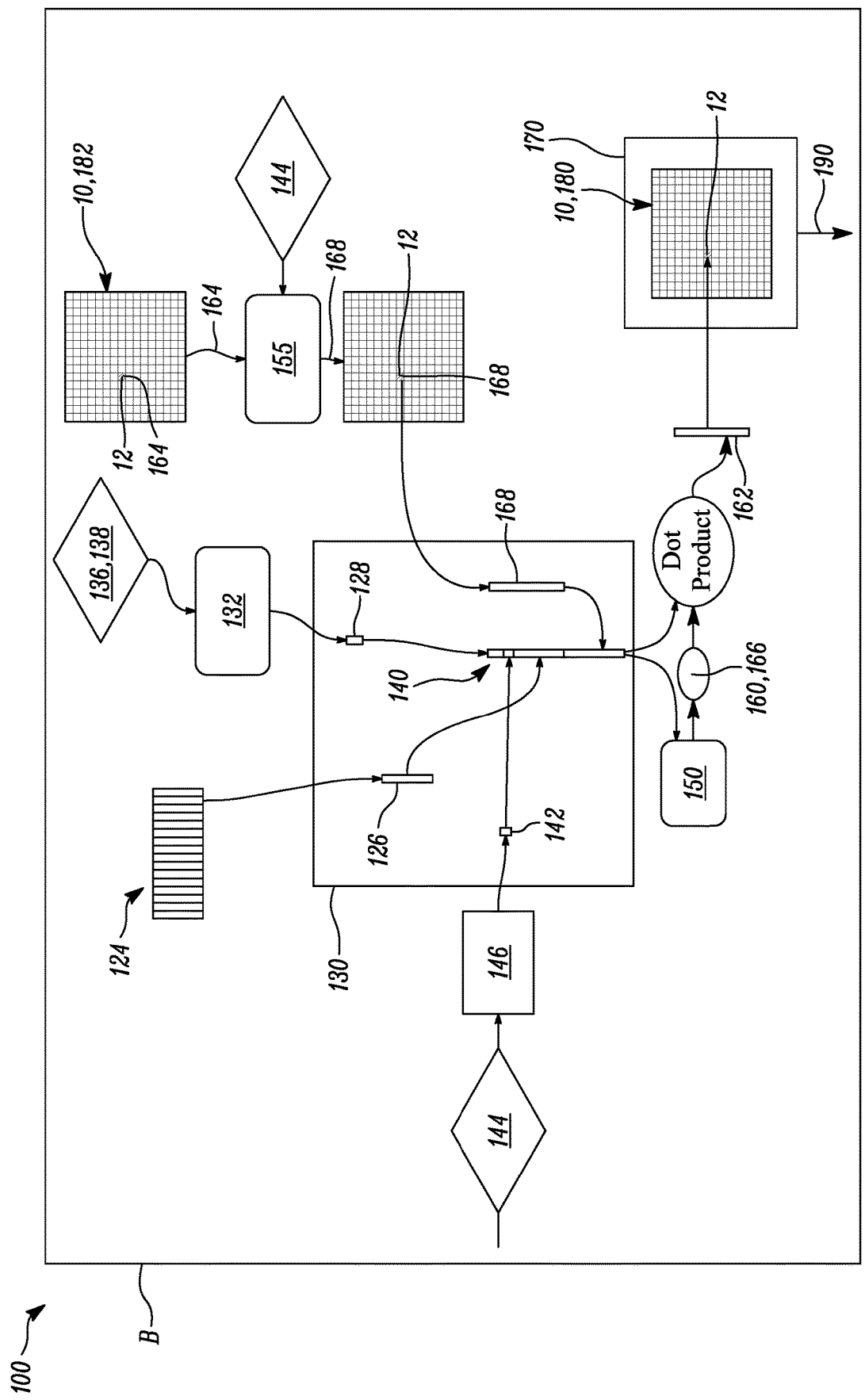
FIG. 7 illustrates a detailed schematic block diagram of the object detection system for updating the cartesian representation of the ROI, according to another embodiment of the present disclosure.

FIG. 7 illustrates a detailed schematic block diagram of the object detection system 100 for updating the cartesian representation 10 of the ROI 20 shown in FIG. 2, according to another embodiment of the present disclosure.

The object detection system 100 illustrated in FIG. 7 is substantially similar to the object detection system 100 illustrated in FIG. 5. In some other embodiments, the object detection system 100 illustrated in FIG. 7 may be substantially similar to the object detection system 100 illustrated in FIG. 4. A few common components of the object detection system 100 are not shown in FIG. 7 for clarity purposes. Specifically, the at least one sensor 110 and the at least one sensor encoding neural network 120 implemented in the computing device A are not shown in FIG. 7. The components of the object detection system 100 implemented in the computing device B are shown in FIG. 7. Specifically, the projection module 130, the convolutional neural network 150, and the object detection network 170 are shown in FIG. 7.

In this embodiment, the at least one learned output 160 includes at least one learned weight matrix 166 corresponding to the at least one cell 12. In the illustrated embodiment of FIG. 7, the at least one learned output 160 includes one learned output 160 including one learned weight matrix 166 corresponding to the one cell 12. In such embodiments, the convolutional neural network 150 may include a MLP structure.

However, in some other embodiments, the at least one learned output 160 may include a plurality of learned weight matrices 166 corresponding to the plurality of cells 12. In yet other embodiments, the at least one learned output 160 may include a batch of learned weight matrices 166 corresponding to the batch of cells 12.

Further, in the illustrated embodiment of FIG. 7, the object detection network 170 is further configured to determine the at least one learned cell feature vector 162 corresponding to the at least one cell 12 as a dot-product of the at least one transformed tensor 140 and the at least one learned weight matrix 166. In some embodiments, a size of the transformed tensor 140 is Kc. In such embodiments, a size of the learned weight matrix 166 is Kc×Km, where Km is a size of the at least one learned cell feature vector 162 corresponding to the at least one cell 12.

In some embodiments, each of the at least one learned weight matrix 166 is normalized, such that a sum of each row of each of the at least one learned weight matrix 166 is equal to one, and/or each entry of each of the at least one learned weight matrix 166 is greater than or equal to zero and less than or equal to 1.

The object detection network 170 is further configured to replace the at least one previous cell feature vector 164 corresponding to the at least one cell 12 with the at least one learned cell feature vector 162 to generate the updated cartesian representation 180, and provide the one or more perception outputs 190 for the ROI 20 (shown in FIG. 2) using the updated cartesian representation 180 of the ROI 20.

FIG. 8 illustrates a schematic diagram of the at least one sensor 110 disposed in the ROI 20, according to an embodiment of the present disclosure. Specifically, in the illustrated embodiment of FIG. 8, the at least one sensor 110 includes the plurality of sensors 110. The plurality of sensors 110 covers the ROI 20. Specifically, each of the plurality of sensors 110 covers a corresponding portion 25 of the ROI 20.

In the illustrated example of FIG. 8, the plurality of sensors 110 includes two sensors 110A and 110B. However, in some other embodiments, the plurality of sensors 110 may include any number of sensors, as per desired application attributes.

The sensor 110A covers a portion 25A of the ROI 20 and the sensor 110B covers a portion 25B of the ROI 20. Specifically, a plurality of view cones 115X of the sensor 110A covers the portion 25A of the ROI 20 and a plurality of view cones 115Y of the sensor 110B covers the portion 25B of the ROI 20. In some embodiments, the portion 25A of the ROI 20 and the portion 25B of the ROI 20 may be at least partially overlapping.

Since the sensors 110A, 110B are spaced apart from each other, the sensor POV data 122 (shown in FIG. 1) is different for the sensors 110A, 110B. The sensor POV data 122 of the sensor 110A includes information about an object 30A. Further, the sensor POV data 122 of the sensor 110B includes information about the objects 30A, 30C, and an object 30B which is disposed in the portion 25B of the ROI 20 and not in the portion 25A of the ROI 20.

The sensor POV data 122 of the sensor 110A also includes information about an object 30D disposed in the portion 25A of the ROI 20 which overlaps with the portion 25B of the ROI 20. However, the sensor POV data 122 of the sensor 110B does not include any information about the object 30D. Therefore, the information about the object 30D may be due to an error in the sensor 110A or a false detection by the sensor 110A. Since the sensor POV data 122 of the sensor 110B does not include any information about the object 30D and the sensor POV data 122 of the sensor 110B includes the information about the object 30B, the sensor POV data 122 of the sensor 110B provides a strong counter evidence against the object 30D. Specifically, the sensor POV data 122 of the sensor 110B would not include information about the object 30B (since the object 30B would be occluded) if the object 30D was not a false detection by the sensor 110A. Therefore, the object detection system 100 learns that the object 30D is the false detection by the sensor 110A.

Similarly, the sensor POV data 122 of the sensor 110B includes the information about the object 30C disposed in the portion 25B of the ROI 20 which overlaps with the portion 25A of the ROI 20. Further, the sensor POV data 122 of the sensor 110A does not include any information about the object 30C. However, the sensor POV data 122 of the sensor 110A does not include the information about the object 30C because the object 30C is occluded by the object 30A. Therefore, the object detection system 100 learns that the object 30C is not a false detection by the sensor 110B. Specifically, the updated cartesian representation 180 (shown in FIGS. 4-7) based on the at least one learned output 160 incorporates information about occlusion or line of sight of the sensors 110A, 110B for the at least one cell 12 of the cartesian representation 10 corresponding to the at least one learned output 160 even when its cone vector 126 does not contain information related to any 3D measurement, such as a distance/depth.

The counter evidence against the object 30D or counter evidence for the object 30C based on the occlusion information may not be provided by conventional object detection techniques which fuse the raw data from multiple sensors (for e.g., the sensors 110A, 110B) or fuse the fully processed data at the object detection stage. Further, the conventional object detection techniques may require information related to the 3D measurements for projection of view cones into a cartesian space and obtaining information about occluded or visible regions. The conventional object detection techniques may require the information related to the 3D measurements for projection of view cones using one or more static rules.

Therefore, the object detection system 100 of the present disclosure may also prevent inconsistent information (e.g., due to false detection of objects by one or more sensors 110) about the one or more objects 30 in the ROI 20.

Figure 9:
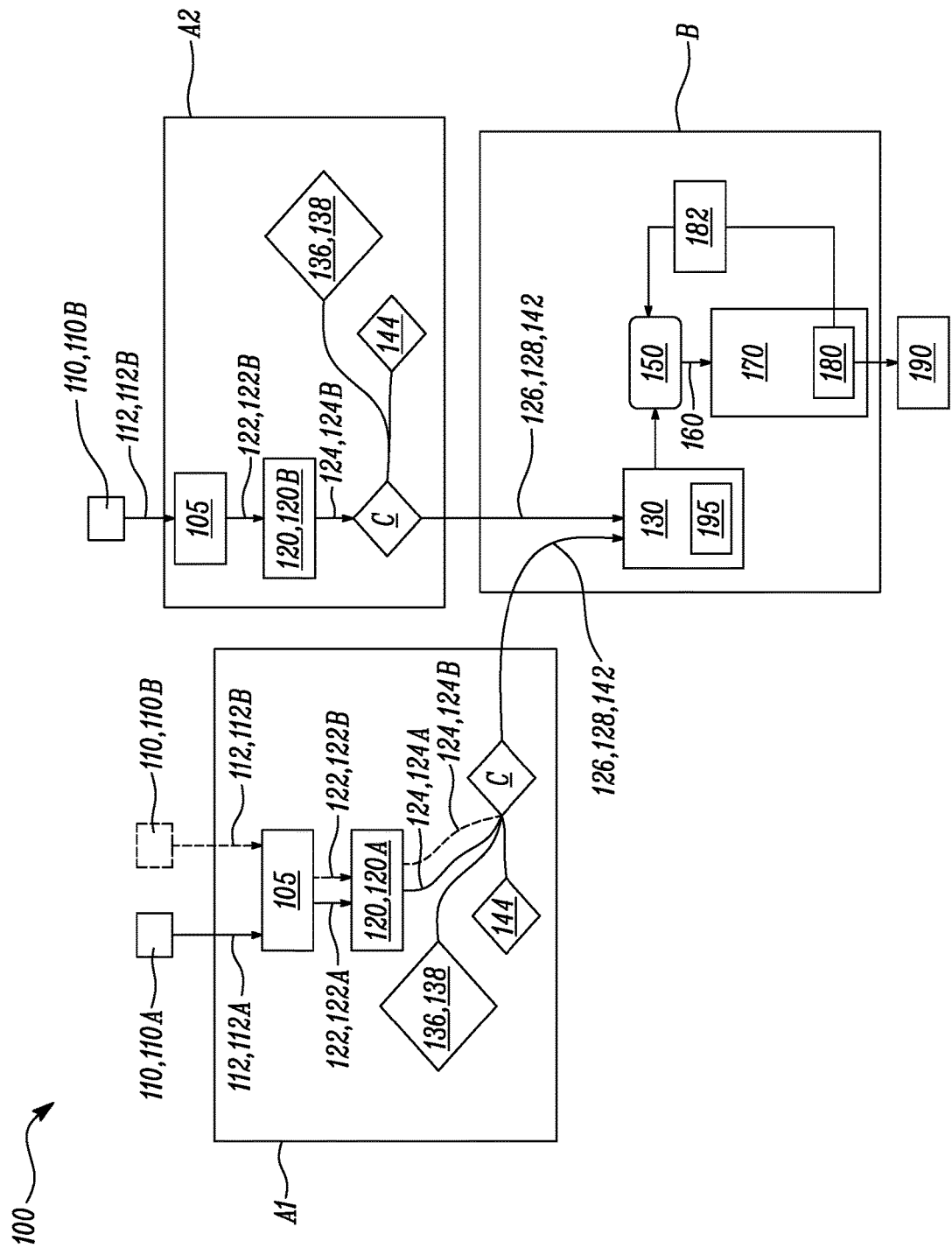
FIG. 9 illustrates a schematic block diagram of the object detection system for updating the cartesian representation of the ROI, according to an embodiment of the present disclosure; and, FIG. 10 illustrates a flowchart depicting a method for updating the cartesian representation of the ROI, according to an embodiment of the present disclosure.

FIG. 9 illustrates a schematic block diagram of the object detection system 100 for updating the cartesian representation 10 (shown in FIG. 3A) of the ROI 20 shown in FIG. 8, according to an embodiment of the present disclosure.

In some embodiments, the at least one sensor encoding neural network 120 generates a plurality of polar feature vectors 124 based on the sensor POV data 122 received from the plurality of sensors 110. For example, the at least one sensor encoding neural network 120 generates a polar feature vector 124A based on a sensor POV data 122A of the sensor 110A and the at least one sensor encoding neural network 120 generates a polar feature vector 124B based on a sensor POV data 122B of the sensor 110A. The sensor POV data 122A is based on a sensor data 112A generated by the sensor 110A and the sensor POV data 122B is based on a sensor data 112B generated by the sensor 110B.

In some embodiments, the at least one sensor encoding neural network 120 includes a plurality of sensor encoding neural networks 120. For example, in the illustrated embodiment of FIG. 9, the at least one sensor encoding neural network 120 includes a sensor encoding neural network 120A and a sensor encoding neural network 120B.

In some examples, the sensor encoding neural network 120A generates the polar feature vector 124A based on the sensor POV data 122A of the sensor 110A and the sensor encoding neural network 120B generates the polar feature vector 124B based on the sensor POV data 122B of the sensor 110B.

In the illustrated embodiment of FIG. 9, the sensor encoding neural network 120A is implemented in a computing device A1 and the sensor encoding neural network 120B is implemented in a computing device A2. However, in some other embodiments, the sensor encoding neural network 120A and the sensor encoding neural network 120B may be implemented in a same computing device (e.g., the computing device A1).

Alternatively (indicated by dashed lines in FIG. 9), the sensor encoding neural network 120A may generate the polar feature vector 124A based on the sensor POV data 122A of the sensor 110A and the polar feature vector 124B based on the sensor POV data 122B of the sensor 110B. Therefore, in some embodiments, one of the at least one sensor encoding neural network 120 (e.g., the sensor encoding neural network 120A) may serve two or more of the plurality of sensors 110.

In some embodiments, the plurality of polar feature vectors 124 are transferred to the projection module 130, for example, via the communication device C. In some embodiments, the projection module 130 is configured to add the plurality of polar feature vectors 124 to a queue 195, such that each polar feature vector 124 from the plurality of polar feature vectors 124 in the queue 195 is generated prior to a succeeding polar feature vector 124 from the plurality of polar feature vectors 124. For example, in case the polar feature vector 124A is generated prior to the polar feature vector 124B, the polar feature vector 124B will be the succeeding polar feature vector 124. In other words, the polar feature vector 124A is earlier in the queue 195 than the polar feature vector 124B as the polar feature vector 124A has been generated earlier.

In some embodiments, the cartesian representation 10 (shown in FIG. 3A) is sequentially updated based on each polar feature vector 124 in the queue 195. For example, the cartesian representation 10 is updated based the polar feature vector 124A prior to updating based on the polar feature vector 124B in the queue 195.

Figure 10:
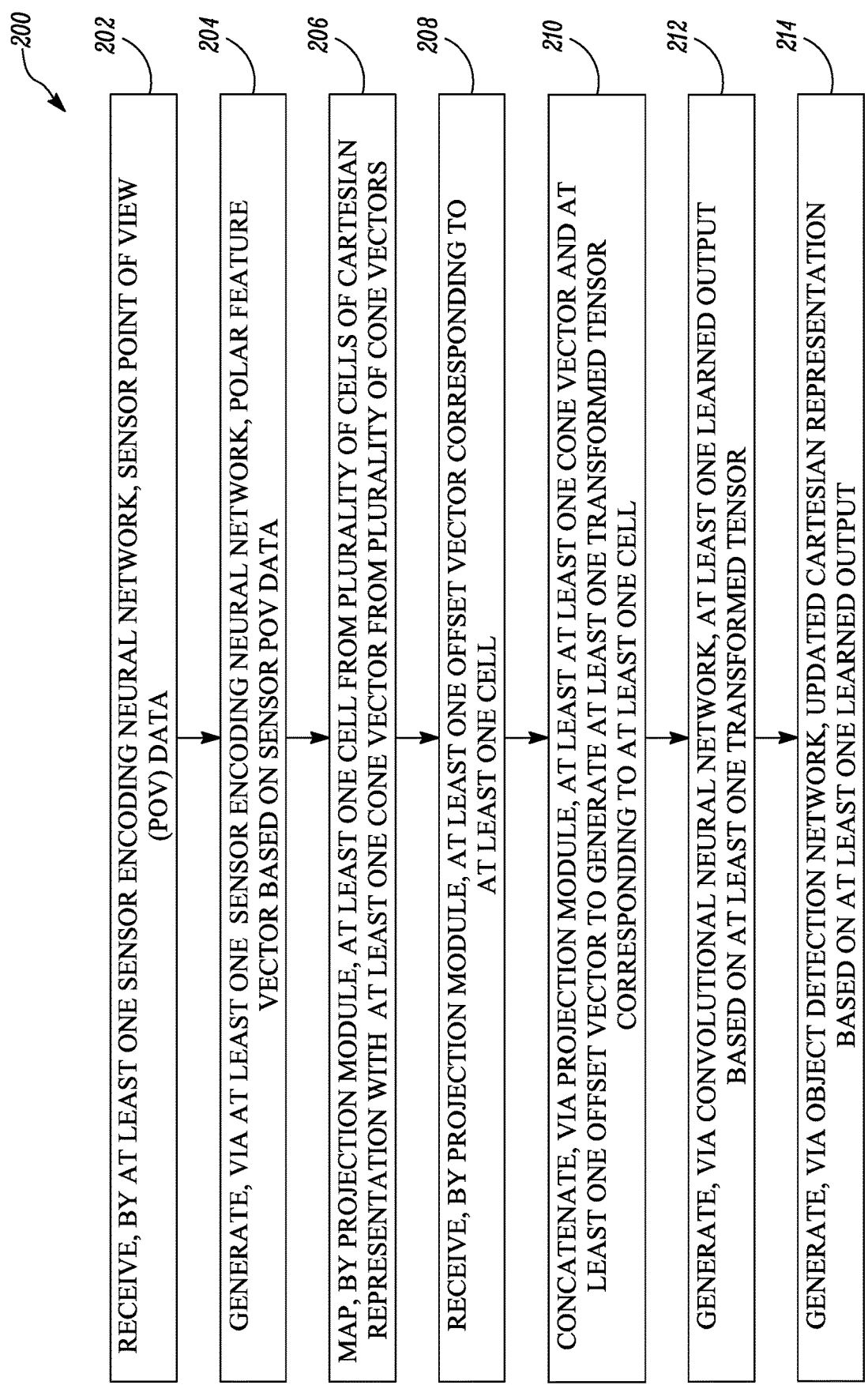

FIG. 10 illustrates a flowchart depicting a method 200 for updating the cartesian representation 10 (shown in FIG. 3A) of the ROI 20 (shown in FIGS. 2 and 8), according to an embodiment of the present disclosure. The method 200 will be further described with reference to FIGS. 1 to 9.

At step 202, the method 200 includes receiving, by at least one sensor encoding neural network 120, the sensor POV data 122. The sensor POV data 122 is based on the sensor data 112 generated by the at least one sensor 110 for the plurality of view cones 115. In some embodiments, each of the plurality of view cones 115 is defined by the angular range 117 about the at least one sensor 110. In some embodiments, the sensor POV data 122 is the spherical projection or the cylindrical projection of the sensor data 112.

At step 204, the method 200 includes generating, via the at least one sensor encoding neural network 120, the polar feature vector 124 based on the sensor POV data 122. The polar feature vector 124 includes the plurality of cone vectors 126 corresponding to the plurality of view cones 115. In some embodiments, the polar feature vector 124 generated by the at least one sensor encoding neural network 120 is a one-dimensional vector of vectors.

At step 206, the method 200 includes mapping, by the projection module 130, the at least one cell 12 from the plurality of cells 12 of the cartesian representation 10 with the at least one cone vector 126 from the plurality of cone vectors 126. The at least one cone vector 126 corresponds to the at least one view cone 115 from the plurality of view cones 115.

At step 208, the method 200 includes receiving, by the projection module 130, the at least one offset vector 128 corresponding to the at least one cell 12. The at least one offset vector 128 is based on the position of the at least one sensor 110 relative to the at least one cell 12 of the cartesian representation 10.

In some embodiments, the method 200 further includes generating, via the offset encoding module 132, the at least one offset vector 128 based on the one or more offset parameters 134 corresponding to the at least one cell 12. In some embodiments, the one or more offset parameters 134 are further based on the one or more sensor parameters 136 indicative of the position of the at least one sensor 110 relative to the at least one cell 12.

In some embodiments, the at least one offset vector 128 is generated further based on the one or more sensor performance parameters 138. In some embodiments, the one or more sensor performance parameters 138 are indicative of the performance of the at least one sensor 110.

In some embodiments, the method 200 further includes receiving, by the projection module 130, the at least one timing vector 142 corresponding to the at least one cell 12. The at least one timing vector 142 is indicative of the time instance when the sensor data 112 for the at least one view cone 115 is generated.

In some embodiments, the method 200 further includes receiving, by the projection module 130, the at least one previous cell feature vector 164 of the previously updated cartesian representation 182 corresponding to the at least one cell 12.

In some embodiments, the method 200 further includes receiving, via the state adaptation module 155, the at least one previous cell feature vector 164 of the previously updated cartesian representation 182 corresponding to the at least one cell 12. In some embodiments, the state adaptation module 155 is a convolutional neural network.

In some embodiments, the method 200 further includes adjusting, via the state adaptation module 155, the at least one previous cell feature vector 164 to generate the at least one adapted previous cell feature vector 168. In some embodiments, adjusting the at least one previous cell feature vector 164 further includes multiplying the magnitude of the at least one previous cell feature vector 164 by the scalar decay value to generate the at least one adapted previous cell feature vector 168. In some embodiments, the scalar decay value is based on the time elapsed since the generation of the previously updated cartesian representation 182.

At step 210, the method 200 includes concatenating, via the projection module 130, at least the at least one cone vector 126 and the at least one offset vector 128 to generate the at least one transformed tensor 140 corresponding to the at least one cell 12.

In some embodiments, the at least one transformed tensor 140 is generated by further concatenating the at least one timing vector 142 with the at least one cone vector 126 and the at least one offset vector 128.

In some embodiments, the at least one transformed tensor 140 is generated by further concatenating the at least one previous cell feature vector 164 with the at least one cone vector 126 and the at least one offset vector 128.

In some embodiments, the at least one transformed tensor 140 is generated by further concatenating the at least one previous cell feature vector 164 with the at least one cone vector 126, the at least one offset vector 128, and the at least one timing vector 142.

In some embodiments, the at least one transformed tensor 140 is generated by further concatenating the at least one adapted previous cell feature vector 168 with the at least one cone vector 126 and the at least one offset vector 128.

In some embodiments, the at least one transformed tensor 140 is generated by further concatenating the at least one adapted previous cell feature vector 168 with the at least one cone vector 126, the at least one offset vector 128, and the at least one timing vector 142.

At step 212, the method 200 includes generating, via the convolutional neural network 150, the at least one learned output 160 based on the at least one transformed tensor 140.

At step 214, the method 200 includes generating, via the object detection network 170, the updated cartesian representation 180 based on the at least one learned output 160.

In some embodiments, the at least one cell 12 includes the plurality of cells 12 the at least one cone vector 126 includes the plurality of cone vectors 126, the at least one offset vector 128 includes the plurality of offset vectors 128 corresponding to the plurality of cells 12, the at least one transformed tensor 140 includes the plurality of transformed tensors 140 corresponding to the plurality of cells 12, and the at least one learned output 160 includes the plurality of learned cell feature vectors 162 corresponding to the plurality of cells 12.

In some embodiments, generating the updated cartesian representation 180 further includes replacing, via the object detection network 170, the plurality of previous cell feature vectors 164 corresponding to the plurality of cells 12 with the plurality of learned cell feature vectors 162 to generate the updated cartesian representation 180.

In some embodiments, the at least one cell 12 includes the one cell 12, the at least one offset vector 128 includes the one offset vector 128 corresponding to the one cell 12, the at least one transformed tensor 140 includes the one transformed tensor 140 corresponding to the one cell 12, the at least one learned output 160 includes the one learned cell feature vector 162 corresponding to the one cell 12. In some embodiments, generating the updated cartesian representation 180 further includes replacing, via the object detection network 170, the one previous cell feature vector 164 corresponding to the one cell 12 with the one learned cell feature vector 162 to generate the updated cartesian representation 180.

In some embodiments, the at least one learned output 160 includes the at least one learned weight matrix 166 for the at least one cell 12. In some embodiments, the method 200 further includes determining, via the object detection network 170, the at least one learned cell feature vector 162 corresponding to the at least one cell 12 as the dot-product of the at least one transformed tensor 140 and the at least one learned weight matrix 166. In some embodiments, generating the updated cartesian representation 180 further includes replacing, via the object detection network 170, the at least one previous cell feature vector 164 for the at least one cell 12 with the at least one learned cell feature vector 162 to generate the updated cartesian representation 180.

In some embodiments, the method 200 further includes providing, via the object detection network 170, the one or more perception outputs 190 for the ROI 20 using the updated cartesian representation 180 of the ROI 20.

In some embodiments, the at least one sensor 110 includes the plurality of sensors 110 and the at least one sensor encoding neural network 120 generates the plurality of polar feature vectors 124 based on the sensor POV data 122 received from the plurality of sensors 110.

In some embodiments, the method 200 further includes adding the plurality of polar feature vectors 124 received by the projection module 130 to the queue 195, such that each polar feature vector 124 from the plurality of polar feature vectors 124 in the queue 195 is generated prior to the succeeding polar feature vector 124 from the plurality of polar feature vectors 124. In some embodiments, the cartesian representation 10 is sequentially updated based on each polar feature vector 124 in the queue 195.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components or layers for example. The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules. The modules described herein are only exemplary and have been described as such for better ease of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), tensor processing units (TPUs), neuromorphic chips, vector accelerators, or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples have been described. These and other examples are within the scope of the following claims.

List of Elements

A Computing Device
A1 Computing Device
A2 Computing Device
B Computing Device
C Communication Device
10 Cartesian Representation
12 Cell
12A Cell
20 Region of Interest (ROI)
25 Portion of ROI
25A Portion
25B Portion
30 Objects
30A Object
30B Object
30C Object
30D Object
100 Object Detection System
105 Sensor Polar Encoding Module
110 Sensor
110A Sensor
110B Sensor
112 Sensor Data
112A Sensor Data
112B Sensor Data
115 View Cones
115A View Cone Origin
115B View Cone Edges
115C View Cone Center Line
115X View Cones
115Y View Cones
117 Angular Range
120 Sensor Encoding Neural Network
120A Sensor Encoding Neural Network
120B Sensor Encoding Neural Network
122 Sensor POV Data
122A Sensor POV Data
122B Sensor POV Data
124 Polar Feature Vector
124A Polar Feature Vector
124B Polar Feature Vector
126 Cone Vector
128 Offset Vector
130 Projection Module
132 Offset Encoding Module
134 Offset Parameters
134A Relative Distance
134B Relative Angular Offset
134C Lateral Distance Offset
134D Vertical Cell Center Angular Offset 134E Vertical Distance
136 Sensor Parameters
138 Sensor Performance Parameters
140 Transformed Tensor
142 Timing Vector
144 Timing Information
146 Timing Encoding Module
150 Convolutional Neural Network
155 State Adaptation Module
160 Learned Output
162 Learned Cell Feature Vector
164 Previous Cell Feature Vector
166 Learned Weight Matrix
168 Adapted Previous Cell Feature Vector
170 Object Detection Network
180 Updated Cartesian Representation
182 Previously Updated Cartesian Representation
190 Perception Output
195 Queue
200 Method
202 Step
204 Step
204 Step
206 Step
208 Step
210 Step
212 Step
214 Step

The invention claimed is:

1. A method for updating a cartesian representation of a region of interest (ROI), the method comprising:
receiving, by at least one sensor encoding neural network implemented in a computing device A, a sensor point of view (POV) data, wherein the sensor POV data is based on a sensor data generated by at least one sensor for a plurality of view cones;
generating, via the at least one sensor encoding neural network, a polar feature vector based on the sensor POV data, wherein the polar feature vector comprises a plurality of cone vectors corresponding to the plurality of view cones;
mapping, by a projection module implemented in a computing device B, at least one cell from a plurality of cells of the cartesian representation with at least one cone vector from the plurality of cone vectors, wherein the at least one cone vector corresponds to at least one view cone from the plurality of view cones;
generating, via an offset encoding module implemented in the computing device B, at least one offset vector based on one or more offset parameters corresponding to the at least one cell, wherein the at least one offset vector is generated further based on one or more sensor performance parameters, and wherein the one or more sensor performance parameters are indicative of a performance of the at least one sensor;
receiving, by the projection module, the at least one offset vector corresponding to the at least one cell, wherein the at least one offset vector is based on a position of the at least one sensor relative to the at least one cell of the cartesian representation;
concatenating, via the projection module, at least the at least one cone vector and the at least one offset vector to generate at least one transformed tensor corresponding to the at least one cell;
generating, via a convolutional neural network implemented in the computing device B, at least one learned output based on the at least one transformed tensor; and
generating, via an object detection network implemented in the computing device B, an updated cartesian representation based on the at least one learned output.

2. The method of claim 1, wherein each of the plurality of view cones is defined by an angular range about the at least one sensor.

3. The method of claim 1, wherein the sensor POV data is a spherical projection or a cylindrical projection of the sensor data, and wherein the polar feature vector generated by the at least one sensor encoding neural network is a one dimensional vector of vectors.

4. The method of claim 1, wherein:
the at least one cell comprises the plurality of cells;
the at least one cone vector comprises the plurality of cone vectors;
the at least one offset vector comprises a plurality of offset vectors corresponding to the plurality of cells;
the at least one transformed tensor comprises a plurality of transformed tensors corresponding to the plurality of cells;
the at least one learned output comprises a plurality of learned cell feature vectors corresponding to the plurality of cells; and
generating the updated cartesian representation further comprises replacing, via the object detection network, a plurality of previous cell feature vectors corresponding to the plurality of cells with the plurality of learned cell feature vectors to generate the updated cartesian representation; and
the method further comprising providing, via the object detection network, one or more perception outputs for the ROI using the updated cartesian representation of the ROI.

5. The method of claim 1, wherein:
the at least one cell comprises one cell;
the at least one offset vector comprises one offset vector corresponding to the one cell;
the at least one transformed tensor comprises one transformed tensor corresponding to the one cell;
the at least one learned output comprises one learned cell feature vector corresponding to the at least one cell; and
generating the updated cartesian representation further comprises replacing, via the object detection network, one previous cell feature vector corresponding to the at least one cell with the one learned cell feature vector to generate the updated cartesian representation; and
the method comprising providing, via the object detection network, one or more perception outputs for the ROI using the updated cartesian representation of the ROI.

6. The method of claim 1, wherein the at least one learned output comprises at least one learned weight matrix corresponding to the at least one cell, the method further comprising determining, via the object detection network, at least one learned cell feature vector corresponding to the at least one cell as a dot-product of the at least one transformed tensor and the at least one learned weight matrix.

7. The method of claim 6, wherein generating the updated cartesian representation further comprises replacing, via the object detection network, at least one previous cell feature vector corresponding to the at least one cell with the at least one learned cell feature vector to generate the updated cartesian representation; and
the method further comprising providing, via the object detection network, one or more perception outputs for the ROI using the updated cartesian representation of the ROI.

8. The method of claim 1 further comprising receiving, by the projection module, at least one timing vector corresponding to the at least one cell, wherein the at least one timing vector is indicative of a time instance when the sensor data for the at least one view cone is generated, and wherein the at least one transformed tensor is generated by further concatenating the at least one timing vector with the at least one cone vector and the at least one offset vector.

9. The method of claim 1 further comprising receiving, by the projection module, at least one previous cell feature vector of a previously updated cartesian representation corresponding to the at least one cell, wherein the at least one transformed tensor is generated by further concatenating the at least one previous cell feature vector with the at least one cone vector and the at least one offset vector.

10. The method of claim 1 further comprising:
receiving, via a state adaptation module, at least one previous cell feature vector of a previously updated cartesian representation corresponding to the at least one cell; and
adjusting, via the state adaptation module, the at least one previous cell feature vector to generate at least one adapted previous cell feature vector.

11. The method of claim 10, wherein the at least one transformed tensor is generated by further concatenating the at least one adapted previous cell feature vector with the at least one cone vector and the at least one offset vector.

12. The method of claim 10, wherein the state adaptation module is a convolutional neural network.

13. The method of claim 10, wherein adjusting the at least one previous cell feature vector further comprises multiplying a magnitude of the at least one previous cell feature vector by a scalar decay value to generate the at least one adapted previous cell feature vector, and wherein the scalar decay value is based on a time elapsed since a generation of the previously updated cartesian representation.

14. The method of claim 1, wherein the one or more offset parameters are further based on one or more sensor parameters indicative of the position of the at least one sensor relative to the at least one cell.

15. The method of claim 1, wherein:
the at least one sensor comprises a plurality of sensors; and
the at least one sensor encoding neural network generates a plurality of polar feature vectors based on the sensor POV data received from the plurality of sensors; and
the method further comprising adding the plurality of polar feature vectors received by the projection module to a queue, such that each polar feature vector from the plurality of polar feature vectors in the queue is generated prior to a succeeding polar feature vector from the plurality of polar feature vectors, wherein the cartesian representation is sequentially updated based on each polar feature vector in the queue.

16. An object detection system for updating a cartesian representation of a region of interest (ROI), the object detection system comprising:
at least one sensor covering at least a portion of the ROI, wherein the at least one sensor is configured to generate a sensor data for a plurality of view cones;
at least one sensor encoding neural network implemented in a computing device A, the at least one sensor encoding neural network configured to:
receive a sensor point of view (POV) data, wherein the sensor POV data is based on the sensor data; and
generate a polar feature vector based on the sensor POV data, wherein the polar feature vector comprises a plurality of cone vectors corresponding to the plurality of view cones;
a projection module implemented in a computing device B communicably coupled to the computing device A, the projection module configured to:
map at least one cell from a plurality of cells of the cartesian representation with at least one cone vector from the plurality of cone vectors, wherein the at least one cone vector corresponds to at least one view cone from the plurality of view cones;
receive at least one offset vector corresponding to the at least one cell, wherein the at least one offset vector is based on a position of the at least one sensor relative to the at least one cell of the cartesian representation;
concatenate at least the at least one cone vector and the at least one offset vector to generate at least one transformed tensor corresponding to the at least one cell;
a convolutional neural network implemented in the computing device B, the convolutional neural network configured to generate at least one learned output based on the at least one transformed tensor; and
an object detection network implemented in the computing device B, the object detection network configured to generate an updated cartesian representation based on the at least one learned output; and
an offset encoding module implemented in the computing device B, the offset encoding module configured to generate the at least one offset vector based on one or more offset parameters corresponding to the at least one cell and one or more sensor performance parameters, wherein the one or more sensor performance parameters are indicative of a performance of the at least one sensor.

17. The object detection system of claim 16, wherein:
the at least one cell comprises the plurality of cells;
the at least one cone vector comprises the plurality of cone vectors;
the at least one offset vector comprises a plurality of offset vectors corresponding to the plurality of cells;
the at least one transformed tensor comprises a plurality of transformed tensors corresponding to the plurality of cells;
the at least one learned output comprises a plurality of learned cell feature vectors corresponding to the plurality of cells; and
the object detection network is further configured to:
replace a plurality of previous cell feature vectors corresponding to the plurality of cells with the plurality of learned cell feature vectors to generate the updated cartesian representation; and
provide one or more perception outputs for the ROI using the updated cartesian representation of the ROI.

18. The object detection system of claim 16, wherein:
the at least one cell comprises one cell;
the at least one offset vector comprises one offset vector corresponding to the one cell;
the at least one transformed tensor comprises one transformed tensor corresponding to the one cell;
the at least one learned output comprises one learned cell feature vector corresponding to the at least one cell; and
the object detection network is further configured to:
replace one previous cell feature vector corresponding to the one cell with the one learned cell feature vector to generate the updated cartesian representation; and provide one or more perception outputs for the ROI using the updated cartesian representation of the ROI.

19. The object detection system of claim 16, wherein the at least one learned output comprises at least one learned weight matrix corresponding to the at least one cell, and wherein the object detection network is further configured to:
- determine at least one learned cell feature vector corresponding to the at least one cell as a dot-product of the at least one transformed tensor and the at least one learned weight matrix;
- replace at least one previous cell feature vector corresponding to the at least one cell with the at least one learned cell feature vector to generate the updated cartesian representation; and
- provide one or more perception outputs for the ROI using the updated cartesian representation of the ROI.

\* \* \* \* \*